(12) United States Patent
Takaki et al.

(10) Patent No.: US 7,164,978 B2
(45) Date of Patent: Jan. 16, 2007

(54) VEHICLE ELECTRO-HYDRAULIC POWER STEERING UNIT

(75) Inventors: Tetsunao Takaki, Tokyo (JP); Masayasu Miyajima, Tokyo (JP); Toshinori Tanaka, Tokyo (JP); Kiyohide Okamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 148 days.

(21) Appl. No.: 10/975,531

(22) Filed: Oct. 29, 2004

(65) Prior Publication Data

US 2005/0288838 A1 Dec. 29, 2005

(30) Foreign Application Priority Data

Jun. 24, 2004 (JP) ............................ P2004-186405

(51) Int. Cl.
*B62D 6/00* (2006.01)
*B62D 5/04* (2006.01)

(52) U.S. Cl. ........................................ 701/41; 180/443
(58) Field of Classification Search ...................... None
See application file for complete search history.

(56) References Cited

U.S. PATENT DOCUMENTS

| | | | | |
|---|---|---|---|---|
| 5,307,895 A | * | 5/1994 | Duffy | 180/423 |
| 5,513,720 A | * | 5/1996 | Yamamoto et al. | 180/421 |
| 6,069,460 A | * | 5/2000 | Grabowski et al. | 318/434 |
| 6,298,941 B1 | * | 10/2001 | Spadafora | 180/422 |
| 6,427,104 B1 | | 7/2002 | Matsushita et al. | |
| 6,725,963 B1 | * | 4/2004 | Gaunt et al. | 180/419 |

FOREIGN PATENT DOCUMENTS

| | | | |
|---|---|---|---|
| DE | 4241785 A1 | * | 6/1994 |
| JP | 63-25178 A | | 2/1988 |
| JP | 4-95574 A | | 3/1992 |
| JP | 5-270425 A | | 10/1993 |

* cited by examiner

*Primary Examiner*—Michael J. Zanelli
(74) *Attorney, Agent, or Firm*—Sughrue Mion, PLLC

(57) ABSTRACT

A vehicle electro-hydraulic power steering unit includes: a steering mechanism steering a steering wheel in a steering direction; an electro-hydraulic pump; a piston mechanism assisting the steering mechanism in a steering direction; a hydraulic circuit causing an assist force to be generated in response to the steering of the steering mechanism; and a control unit controlling a motor based on an output signal from a vehicle speed sensor, a torque sensor, and a steering angle sensor. In this power steering unit, driving the motor is started when a steering torque exceeds a set torque threshold, and the torque threshold to be set is changed depending on operating conditions. Thus, a vehicle electro-hydraulic power steering unit improved in fuel consumption is obtained.

17 Claims, 23 Drawing Sheets

1: STEERING MECHANISM
10: FRONT WHEEL (STEERED WHEEL)
12: POWER CYLINDER UNIT (PISTON MECHANISM)
19: ROTARY VALVE (SUPPLY-AND-EXHAUST VALVE)
22: ELCTRO-HYDRAULIC PUMP
30: PISTON

1: STEERING MECHANISM
10: FRONT WHEEL (STEERED WHEEL)
12: POWER CYLINDER UNIT (PISTON MECHANISM)
19: ROTARY VALVE (SUPPLY-AND-EXHAUST VALVE)
22: ELCTRO-HYDRAULIC PUMP
30: PISTON

VEHICLE ELECTRO-HYDRAULIC POWER STEERING UNIT

BACKGROUND OF THE INVENTION

1. Field of the Invention

The present invention relates to a vehicle electro-hydraulic power steering unit that assists steering-wheel operating force of a vehicle to reduce an operating force of the steering wheel.

2. Description of the Related Art

As a conventionally typical power steering unit, a hydraulic type power steering unit and an electric type power steering unit have been known. In most of the hydraulic type power steering units, it is an engine that drives an oil pump. In such a hydraulic type power steering unit, however, the oil pump is driven on a steady basis by the engine even at the time of straight running requiring no assist, so that a problem exists in large loss of engine horsepower. On the other hand, an electric type power steering unit is arranged such that the use of the above-described oil pump can be eliminated, and an electric motor is started only when necessary to be power-assisted, so that an advantage resides in small loss of engine horsepower. Furthermore, as a power steering unit utilizing these oil type and electric type jointly, there is an electro-hydraulic type power steering unit in which a motor is utilized instead of the engine acting as a drive source of generating an oil pressure in the hydraulic type, and power is assisted by drive force of the motor at the time of requiring any assist in steering.

FIG. 24 is a schematic view showing a conventional vehicle electro-hydraulic power steering unit, which is disclosed in, for example, the Japanese Patent Publication (unexamined) No. 270425/1993 (pp 3–4, FIG. 1). In the drawing, reference numeral 1a designates, for example, a rack and pinion type steering gear forming a steering mechanism 1. The steering gear 1a is constructed so as to contain a rack 3 extending in a direction of vehicle width, and a pinion gear 4 that engages with the rack 3 within a casing 2 (it is described in more detail in the Japanese Patent Publication (unexamined) No, 95574/1992 (FIGS. 1–2)). Further, the pinion gear 4 is connected to a rotary shaft 6 of the steering gear 1a via a torsion bar 5.

One end portion of the rack 3 is connected to a front wheel 10 on the left side via a steering rod 7, a tie rod 8 and a knuckle 9. The other end portion of the rack 3 is connected to a front wheel 10 on the right side via a power cylinder unit 12 (corresponding to a piston mechanism), a steering rod 11, a tie rod 13 and a knuckle 14.

The rotary shaft that protrudes from the top of the casing 2 is connected to a steering wheel 18 via a steering joint 16, and, e.g., two-piece housing type steering shaft 17. In this manner, by the operation (turning) of the steering wheel 18, a displacement is transmitted to the knuckles 9, 14 through the steering shaft 17, the torsion bar 5, the pinion gear 4, the rack 3 and the steering rods 7, 11, and the front wheels 10, 10 on two sides are steered in a direction of being operated. In addition, numeral 17a designates a steering column.

Further, a rotary valve 19 (supply and exhaust valve) is provided between the rotary shaft 6 of the steering gear 1a and the pinion gear 4. In this rotary valve 19, as known (for example, in the Japanese Patent Publication (unexamined) No. 95574/1992 (FIGS. 1–2)), an outer valve 19a having a tubular shape is provided on the pinion gear 4, and an inner valve 19b having a tubular shape that engages with the outer valve 19a is provided on the rotary shaft 6. That is, the rotary valve 19 is arranged such that torsion of the torsion bar 5 causes a relative displacement to occur between the outer valve 19a and the inner valve 19b.

An inlet port 20 that is formed in the foregoing rotary valve 19 is connected to a discharge part of an electro-hydraulic pump 22 via a passage 21; and an outlet port 23 is connected to an intake part of the electro-hydraulic pump 22 via a passage 24. That is, the electro-hydraulic pump 22 is constructed such that a driving motor 22b is directly connected to a pump section 22a, and a reservoir 22c is connected to the intake part of the pump section 22a; and that the passage 21 is connected to the discharge port of the pump section 22a, and the passage 24 is connected to the intake port of the reservoir 22c.

The motor 22b of the electro-hydraulic pump 22b is connected to a power supply circuit, which is constituted of a battery and alternator mounted on the vehicle being connected in parallel (any one of them is not shown). The electro-hydraulic pump 22 is brought in operation with an electric power from the foregoing power supply circuit being the source of power. A pair of output port parts 26a, 26b that are formed at the rotary valve 19 are connected to the power cylinder unit 12 via passages 27a, 27b.

That is, the power cylinder unit 12 is constructed such that a piston rod 28, which is connected to the steering rod 11, runs through a cylinder 29 that is fixed to, e.g., frame of an automobile, and that a piston 30 slidable, partitioning an internal part of the cylinder 29 into right and left (in a direction of vehicle width), is provided on a part of this piston rod 28. Chambers 31a, 31b (pressure-receiving chambers) on both (right and left) sides of the piston that are formed by partitioning with this piston 30 are connected to the mentioned output port parts 26a, 26b via a pair of input port parts 32a, 32b and passages 27a, 27b.

In the hydraulic circuit 34 of such a construction, when the steering wheel 18 is in a neutral state, an oil pressure that is generated in the electro-hydraulic pump 22 is supplied to both chambers 31a, 31b as a neutral pressure through the rotary valve 19. Then, at the time of the steering wheel 18 being steered, an oil pressure responsive to a supply and exhaust operation of a relative displacement between the outer valve 19a and the inner valve 19b of the rotary valve 19 in accordance with the steering of the steering wheel 18, that is, an oil pressure in accordance with steering (steering wheel force and steering direction) is supplied to the chambers 31a or 31b. The front wheels 10, 10 can be operated while an oil pressure that are generated in the chambers 31a, 31b rendering an assistance to the steering wheel force.

Further, a control unit 37 that is constituted of a microcomputer and peripheral circuits thereof is connected to the motor 22b of the electro-hydraulic pump 22 via the drive circuit 36. Connected to this control unit 37 are a vehicle speed sensor 38 that detects a speed of vehicle, and a steering torque sensor 39 that detects a steering torque of the steering mechanism 1, for example, a steering torque generated at the steering wheel 18. Further, by means of a circuit that is formed by these electronic equipments being connected, a predetermined assist power is generated in the power cylinder unit 12 at the time of steering depending on a vehicle speed and a steer state; and the operation of the electro-hydraulic pump 22 is stopped over all range of vehicle speed at the time of no steering.

Furthermore, as a function of determining whether or not the steering wheel 18 is operated, the control unit 37 performs a function of comparing an output signal (steering torque) Tss from the steering torque sensor 39 and a set threshold (torque threshold) $T_{10}$ to determine a magnitude therebetween. That is, "steering" is determined when Tss>$T_{10}$, and "no steering" is determined when Tss<$T_{10}$. When the steering is determined, the hydraulic driving motor 22b is driven, necessary oil pressure is generated, and an assist is given to steering. Whereas, when non-steering is determined, the operation of the hydraulic driving motor 22b is stopped over all range of vehicle speed. Consequently, power saving of the electro-hydraulic pump is achieved.

As described above, in the conventional vehicle electro-hydraulic power steering unit, the operation of the hydraulic driving motor is stopped at the time of non-steering, thereby achieving power saving of the electro-hydraulic pump. However, it is a recent trend that a further power saving (improvement in fuel consumption) is required.

SUMMARY OF THE INVENTION

It is an object of the present invention to provide a vehicle electro-hydraulic power steering unit in which a torque threshold to be determined as steering is changed depending on a vehicle speed without negatively affecting steerage of the vehicle electro-hydraulic power steering unit, thereby achieving further improvement in fuel consumption.

A vehicle electro-hydraulic power steering unit according to the invention includes: a steering mechanism steering a steering wheel in a steering direction in response to operation of a steering wheel; an electro-hydraulic pump driven with a motor being a drive source; a piston mechanism that is provided with pressure-receiving chambers on two sides of a piston capable of reciprocating, and that assists the mentioned steering mechanism in a steering direction in accordance with a displacement of the mentioned piston; a hydraulic circuit that provides a connection between the mentioned electro-hydraulic pump and each of the mentioned pressure-receiving chambers of the mentioned piston mechanism via a supply-and-exhaust valve performing a supply and exhaust operation in response to steering of the mentioned steering mechanism, and that causes an assist power to be generated in each of the pressure-receiving chambers in response to the steering of the mentioned steering mechanism; a vehicle speed sensor; a torque sensor detecting a steering torque of the mentioned steering mechanism; a steering angle (rudder angle) sensor; and a control unit controlling the mentioned motor that drives the mentioned electro-hydraulic pump based on an output signal from the mentioned vehicle speed sensor, torque sensor, and steering angle sensor. In this vehicle electro-hydraulic power steering unit, driving the mentioned motor of the mentioned electro-hydraulic pump is started when the mentioned steering torque exceeds a torque threshold to be set, and the mentioned torque threshold to be set is changed depending on operating conditions.

In the vehicle electro-hydraulic power steering unit of above constitution according to the invention, a torque threshold on which steering is determined is changed depending on a vehicle speed, thereby enabling to achieve improvement in fuel consumption without impairing steerage.

Furthermore, in the vehicle electro-hydraulic power steering unit according to this invention, rate of rise in rotation dN/dtf (where: N is the number of revolutions, and tf is a time period) of the mentioned motor (22b) is changed depending on operating conditions of a vehicle at the time of starting to drive the mentioned motor of the mentioned electro-hydraulic pump.

As a result, since the rate of rise in rotation of the mentioned motor is changed depending on operating conditions of a vehicle, it is possible to achieve improvement in fuel consumption without feeling getting worse.

The foregoing and other objects, features, aspects and advantages of the present invention will become more apparent from the following detailed description of the present invention when taken in conjunction.

DETAILED DESCRIPTION OF THE INVENTION

Embodiment 1.

Figure 1:
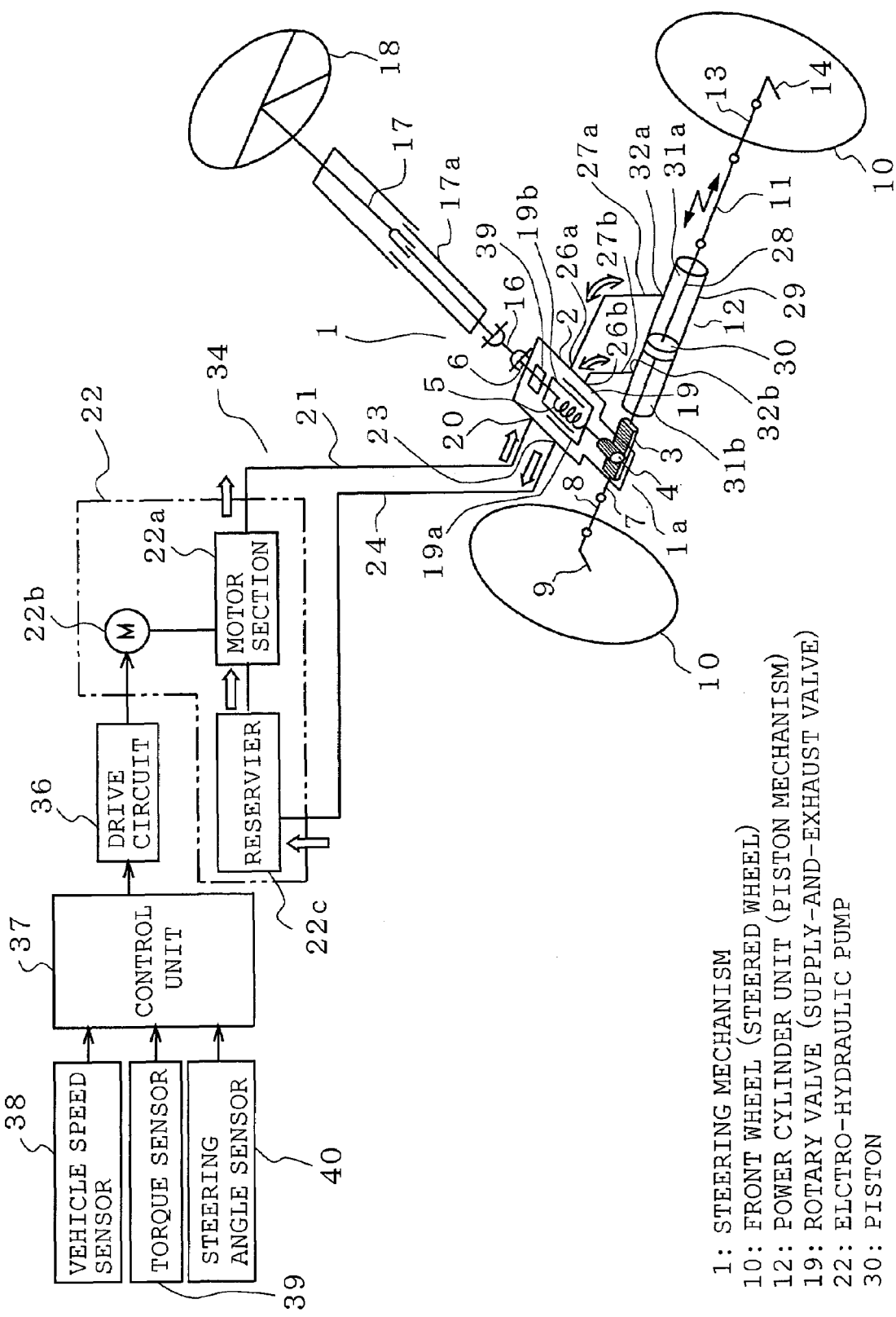
FIG. 1 is a schematic view showing a vehicle electro-hydraulic power steering unit according to a first preferred embodiment of the present invention.
Figure 24:
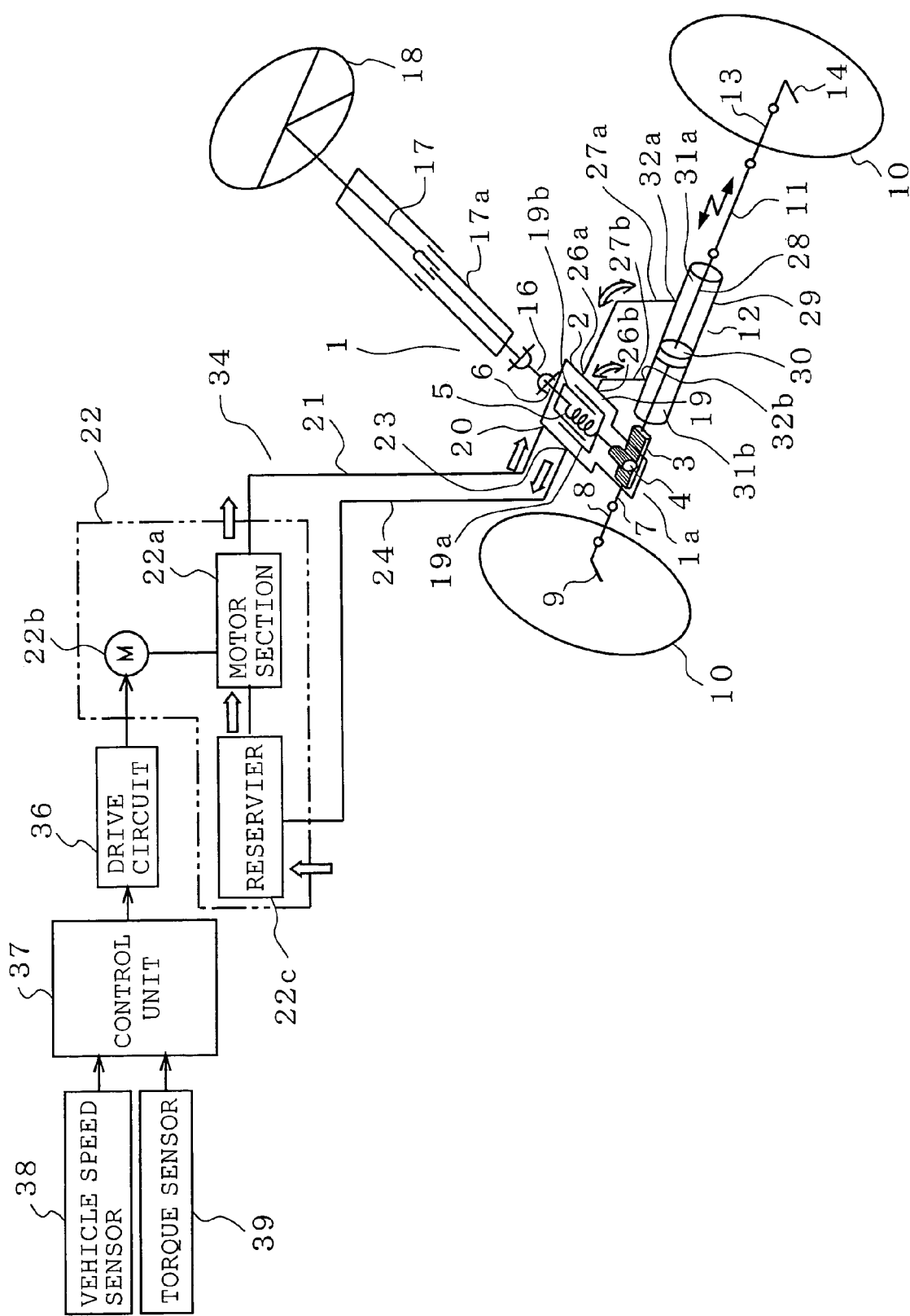
FIG. 24 is a schematic view showing a vehicle electro-hydraulic power steering unit according to the prior art.

FIG. 1 is a schematic view showing a vehicle electro-hydraulic power steering unit according to a first preferred embodiment of the present invention. In the drawing, reference numerals same as those in FIG. 24 designate the same or like parts, which are described utilizing the descriptions of FIG. 24. Now referring to FIG. 1, a torque sensor 39 detects a steering torque that is generated at a steering wheel 18, and is mounted on an input shaft 6 that is connected to the steering wheel 18. Output signals therefrom are introduced to the control unit 37. Unlike in FIG. 24, in FIG. 1, there is further provided a steering angle sensor 40, which detects a steering rudder angel of the steering wheel 18. Output signal therefrom are introduced to the control unit 37. Further, the control unit 37 executes a specific control as to the motor 22b that drives the electro-hydraulic pump 22b based on output signals from the vehicle speed sensor 38, the torque sensor 39 and the a steering angle sensor 40. Additionally, it is preferable that the rotary valve 19 (supply and exhaust valve) is a solenoid operated control valve instead of a mechanical valve. A solenoid operated control valve is described, for example, in the Japanese Patent Publication (unexamined) No. 25178/1988.

In the vehicle electro-hydraulic power steering unit according to the invention, driving the above-mentioned motor that drives an electro-hydraulic pump is started when a steering torque exceeds a set torque threshold, and in which the above-mentioned torque threshold to be set is changed depending on operating conditions of a vehicle such as vehicle speed. In this manner, even if the steering is carried out, a hydraulic pump driving motor is never driven until a steering torque comes to be not less than a set torque threshold so as not to impair steerage. As a result, there is no useless consumption of energy.

Alternatively, according to the vehicle electro-hydraulic power steering unit of the invention, the above-mentioned set torque threshold is changed depending on operating conditions; and the rate of rise in rotation of the above-mentioned motor is changed depending operating conditions such as vehicle speed.

As for the change in torque threshold(for example, 1.2 N·m to 2.5 N·m) according to this first embodiment, for example, in the case where a vehicle during general driving (during running at low to high speed on a general road) runs at high speed, the change in torque is small, and therefore a torque threshold is set to be larger (e.g., 2 N·m) so as not to operate the hydraulic pump driving motor in response to the slight change in steering torque. Furthermore, in the case where a vehicle during general driving runs at low speed, the change in torque is large, and therefore a torque threshold is set to be smaller (e.g., 1.2 N·m) so that the hydraulic pump driving motor is operated in spite of the slight change in steering torque. It is preferable that a torque threshold is changed to be smaller or larger with said torque threshold having been set depending on a vehicle speed a central value responsive to a high speed or a low speed of steering velocity, thereby making easy to assist (or hard to assist).

Further, according to this first embodiment, at the time of starting to drive the hydraulic pump driving motor, the rate of rise in rotation of the motor is changed inversely proportional to a set torque threshold. That is, the rate of rise in rotation of the motor is made smaller in the case where a vehicle during general driving runs at high speed; while it is made larger in the case where a vehicle runs at low speed.

In this manner, a torque threshold is changed depending on a vehicle speed and steering velocity. Further, the rate of rise in rotation of the hydraulic pump driving motor is made larger in the case of a torque threshold being small (at low speed); and it is made smaller in the case of a torque threshold being large (at high speed) to start up the motor slowly. As a result, improvement in fuel consumption can be achieved without feeling getting worse.

Figure 2:
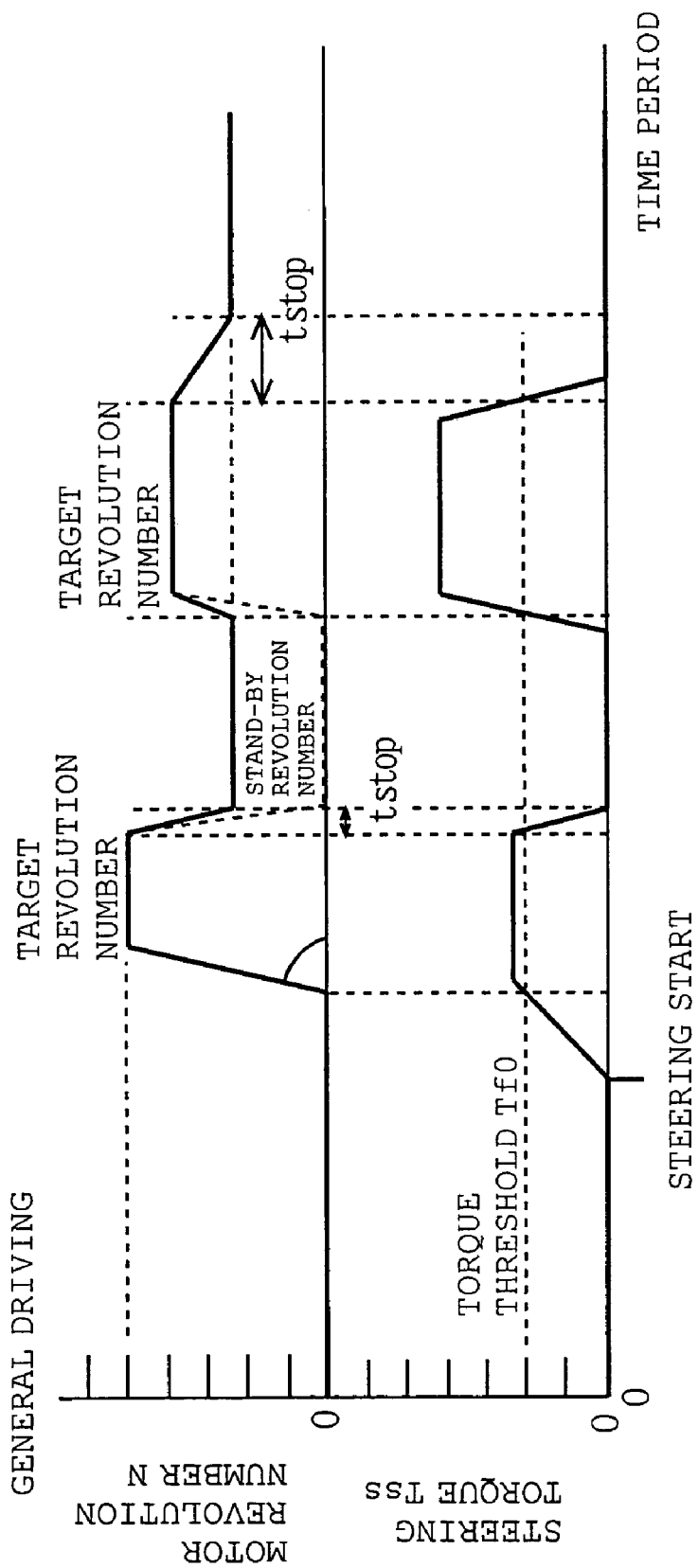
FIG. 2 is a diagram showing a relation between a steering torque and the number of revolutions of a motor with respect to a time period in the case of general driving according to the invention.

FIG. 2 is a diagram showing conditions of general driving at a high, medium and low speed of the vehicle electro-hydraulic power steering unit according to the invention in the aspect of a relation between a steering torque and a motor revolution number with respect to time period. During general driving, when the steering wheel 18 is operated, a steering torque Tss rises. Further, when the steering torque Tss exceeds a set torque threshold $Tf_0$, driving the motor 22b that drives the electro-hydraulic pump 22 is started. As a motor revolution number N rises, an assist power is added to the operation of the steering wheel 18, and the rise in the steering torque Tss is suppressed. When a steering torque starts to decrease falling below a torque threshold $Tf_0$, the motor 22b is settled down to a stand-by revolution number at a predetermined motor revolution number reduction time period or stopped at a stop time period tstop. During general driving, when the steering wheel 18 is operated again, the above-mentioned operations are repeated. In addition, a target revolution number of the motor 22b is a value to be determined depending on a vehicle speed Vv and a steering velocity. In general, the lower a vehicle speed is, the higher the foregoing target revolution number becomes; and the higher a steering velocity is, the higher it becomes.

Figure 13:
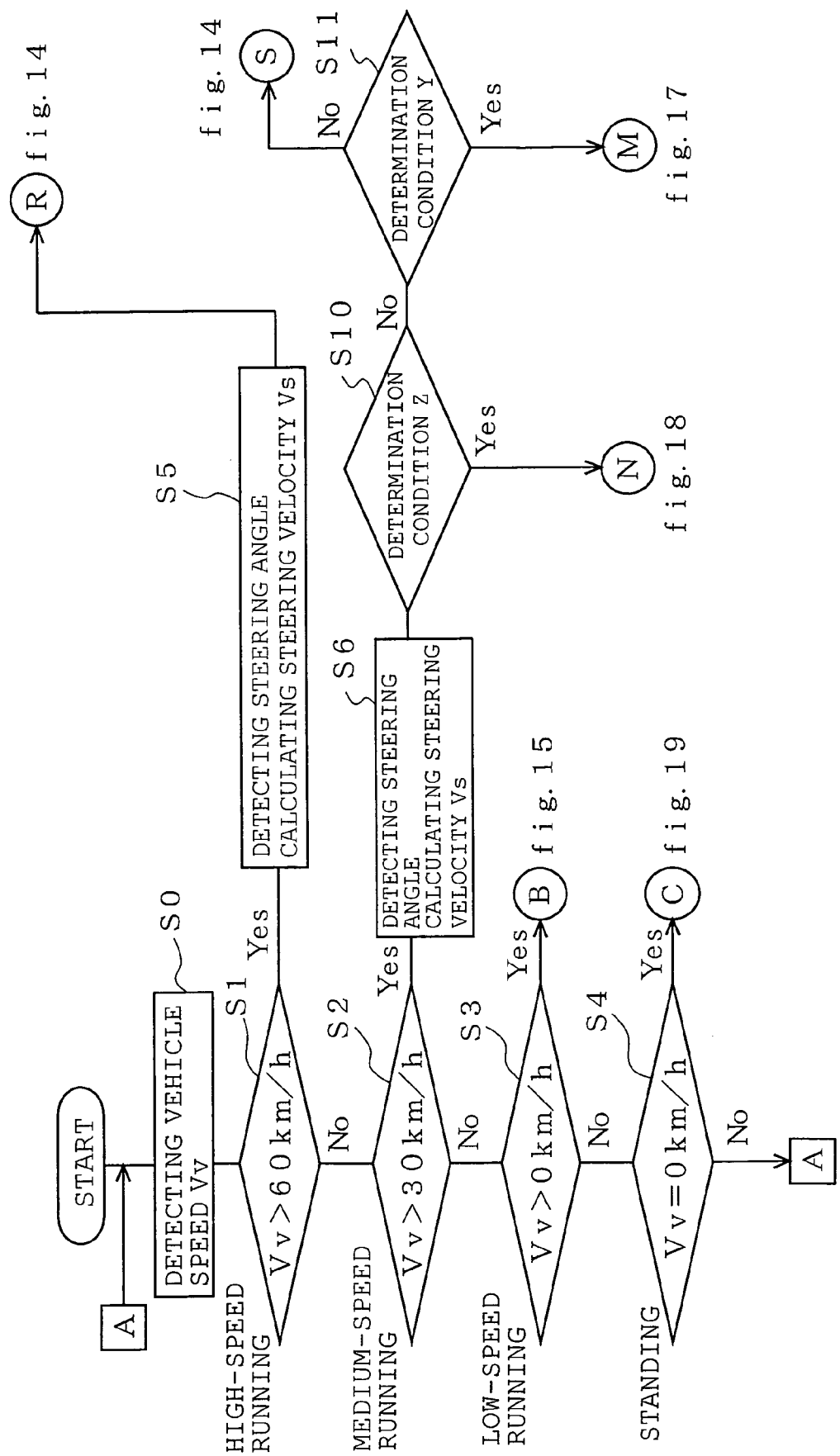
FIG. 13 is a flowchart showing control at the time of running at high speed and a medium speed according to the invention.
Figure 14:
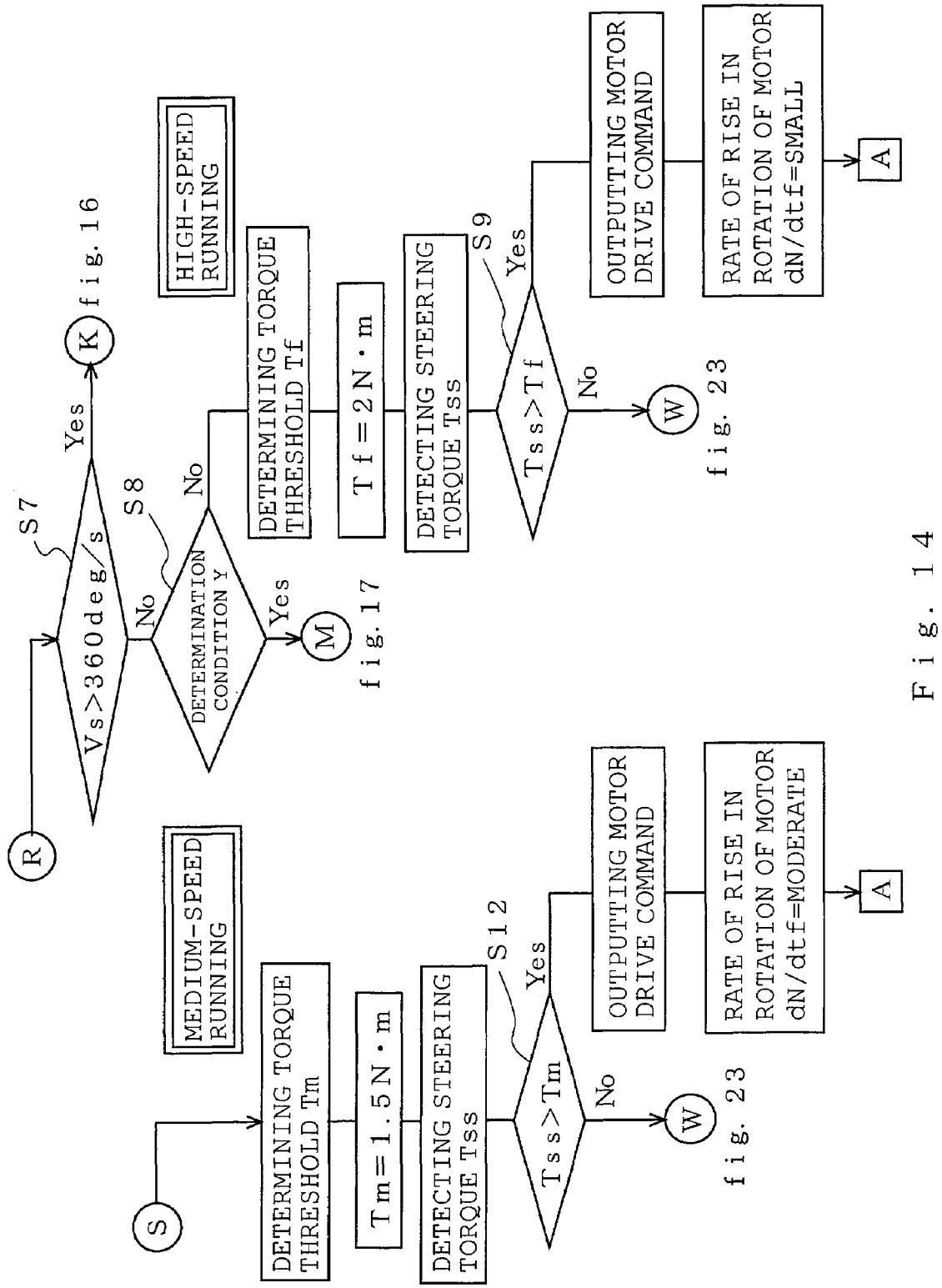
FIG. 14 is a flowchart showing a control at the time of running at high speed and a medium speed according to the invention.

FIGS. 13 and 14 are flowcharts showing the control at the time of running at high speed and a medium speed by the vehicle electro-hydraulic power steering unit according to the invention. First, when a vehicle engine is normally started by the operation of an ignition key, the vehicle speed sensor 38 detects a vehicle speed Vv (S0). Next, in the case where a vehicle speed Vv thereof is not less than 60 km/h (S1; Yes) a steering angle θ is detected by the steering angle sensor 40, and a steering velocity [deg/s] is calculated with an internal timer (S5). On the other hand, in the case where a vehicle velocity Vv is less than 60 km/h in Step S1 (S1; No), the program proceeds to Step S2, in which it is determined whether or not a vehicle speed is not less than 30 km/h. Herein, in the case where a vehicle speed is not less than 30 km/h (S2; Yes), a steering angle θ is detected by the steering angle sensor 40, and a steering velocity Vs [deg/s] is calculated based on an internal timer (S6). Further, in the case where a vehicle speed is less than 30 km/h in Step S2 (S2; No), the program proceeds to Step S3, in which it is determined whether or not a vehicle speed is not less than 0 km/h.

In the case where a steering velocity Vs having been calculated in Step S5 is not less than 360 deg/s in Step S7 of FIG. 14 (S7; Yes), the program proceeds to K of FIG. 16. Further, in the case where a steering velocity Vs is less than 360 deg/s in Step S7 (S7; No), the program proceeds to Step 8. In the case where No is determined on the determination condition Y of Step S8 (not less than 5 times of steering angle ±θ is detected in 3 minutes: where θ is a predetermined angle), running at high speed is determined, and a torque threshold Tf is determined. In the case where Yes is determined on the determination condition Y of Step S8 (S8; Yes), the program proceeds to M of FIG. 17.

Figure 23:
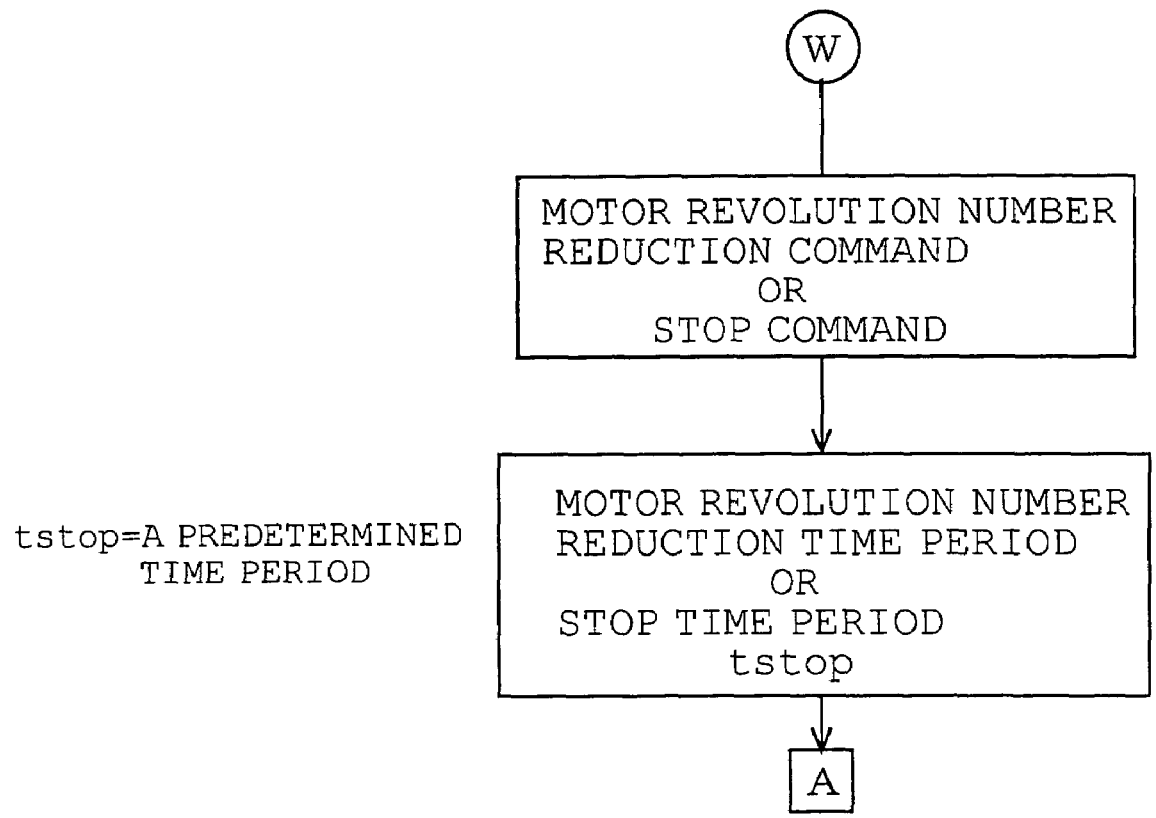
FIG. 23 is a flowchart showing a control of a motor revolution number reduction command or a stop command according to the invention.

With reference to FIG. 14, in the case of running at high speed, a torque threshold Tf is set to be 2 N·m, and a steering torque Tss is detected by the torque sensor 39. Then, in Step S9, the steering torque Tss is compared with a torque threshold Tf. In the case where the steering torque Tss is larger (S9; Yes), a drive command is output to the motor 22n via the drive circuit 36. The drive command at this time causes the rate of rise in rotation dN/dtf (:where N is the number of revolutions, and tf is a time period) to be smaller, and the program returns to Step S0. On the contrary, in the case where the steering torque Tss is smaller than a torque threshold Tf (S9; No), the program proceeds to W of FIG. 23. Through a motor revolution number reduction command or a stop command being outputted, a predetermined motor revolution number reduction time period or a stop time period tstop is outputted (the time period tstop is a predetermined set time period), and the program returns to Step S0.

Figure 3:
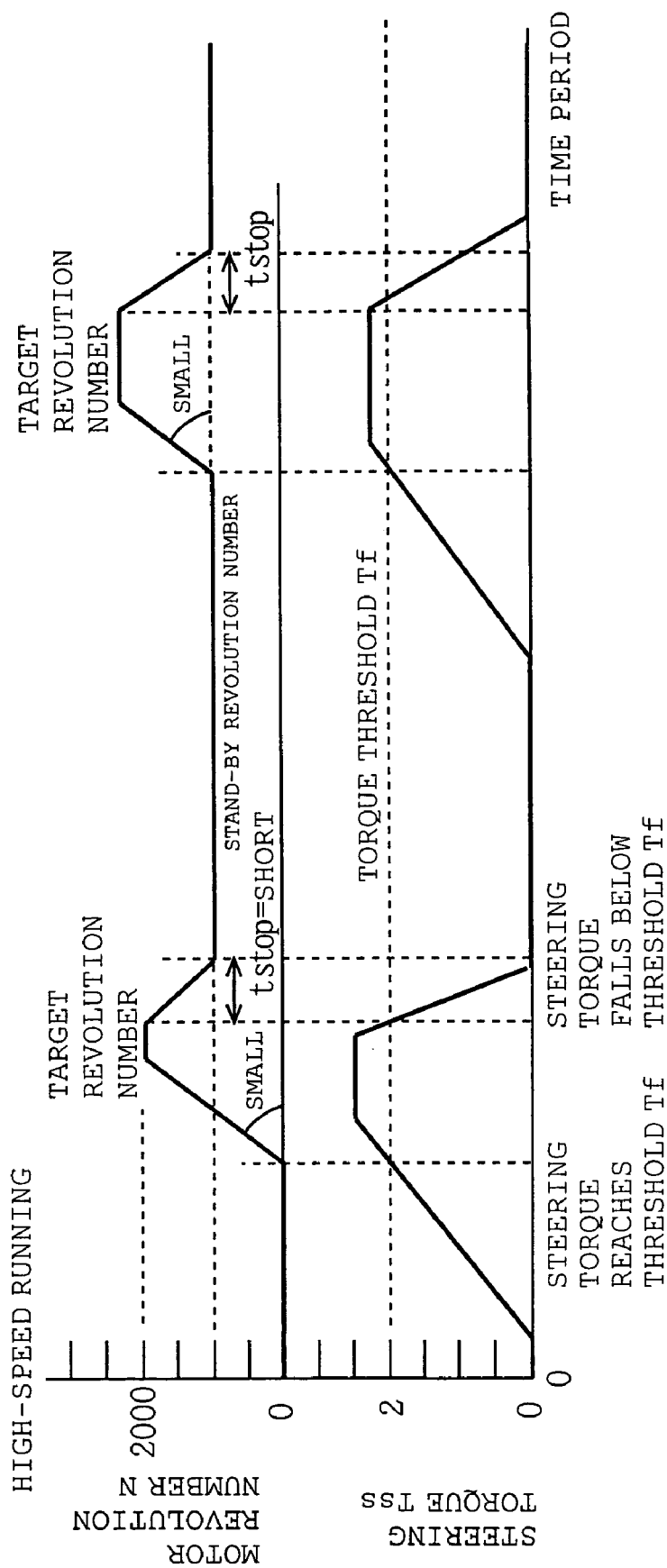
FIG. 3 is a diagram showing a relation between a steering torque and the number of revolutions of a motor with respect to a time period in the case of running at high speed according to the invention.

FIG. 3 is a diagram showing a relation between a steering torque and a motor revolution number with respect to a time period in the case of running at high speed in the vehicle electro-hydraulic power steering unit according to the invention. When the steering wheel 18 is operated during running at high speed, a steering torque Tss rises. Further, when the steering torque Tss exceeds a torque threshold Tf, driving the motor 22b that drives the electro-hydraulic pump 22 is started. As a motor revolution number N rises, an assist power is added to the operation of the steering wheel 18, and the rise in the steering torque Tss is suppressed. When a steering torque starts to decrease falling below the torque threshold Tf, in a short time period, the motor 22b is settled down to a stand-by revolution number at a predetermined motor revolution number reduction time period or stopped at a stop time period tstop. At this time, the reason why the motor is settled at a stand-by revolution number or stopped in a short time period is to save energy. When the steering wheel 18 is operated again during running at high speed, the above-mentioned operations are repeated.

In the case of running at high speed, the torque Tf is set to be a high value (for example, 2 Nm), and the rate of rise in rotation dN/dtf of the motor 22b is set to be small.

Now, in the case of running at medium speed, a steering velocity Vs is calculated in Step S6 of FIG. 13, and thereafter the program proceeds to Step S10. In the case of being detected on the determination condition Z of Step S10 (in the case where not less than 2 N·m of half amplitude of a torque output signal from the torque sensor is detected for not less than 10 seconds) (S10; Yes), running on rough road is determined, which is N of FIG. 18. In the case of not being detected (S10; No), the program proceeds to Step S11. In the case of No being determined on the determination condition Y of Step S11 (S11; No), a medium-speed running is determined, and a torque threshold Tm is determined. In the case of Yes being determined on the determination condition Y of Step S11 (S11; Yes), the program proceeds to M of FIG. 17.

In the case of running at medium speed in FIG. 14, a torque threshold Tm is set to be 1.5 N·m, and the steering torque Tss is detected by the torque sensor 39. Then, in Step S12, the steering torque Tss is compared with a torque threshold Tm. In the case where the steering torque Tss is larger (S12; Yes), the drive command is outputted to the motor 22b via the drive circuit 36. The drive command at this time causes the rate of rise in rotation dN/dtf to be moderate, and the program returns to Step S0. On the contrary, in the case where the steering torque Tss is smaller than a torque threshold Tm (S12; No), the program proceeds to W of FIG. 23. Through a motor revolution number reduction command or a stop command being outputted, a predetermined motor revolution number reduction time period or a stop time period tstop is outputted, and the program returns to Step S0.

Figure 4:
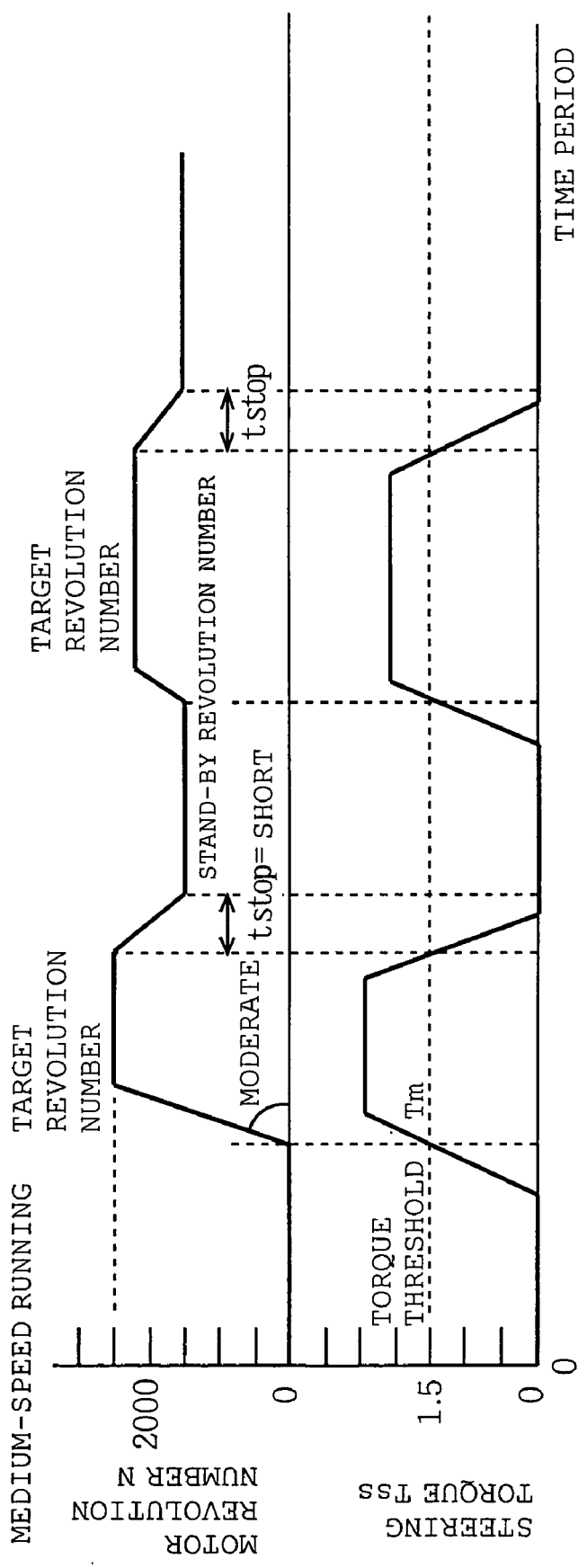
FIG. 4 is a diagram showing a relation between a steering torque and the number of revolutions of a motor with respect to a time period in the case of running at medium speed according to the invention.

FIG. 4 is a diagram showing a relation between a steering torque and a motor revolution number with respect to a time period in the case of running at medium speed in the vehicle electro-hydraulic power steering unit according to the invention. When the steering wheel 18 is operated during running at medium speed, a steering torque Tss rises. When the steering torque Tss exceeds a torque threshold Tm, driving the motor 22b that drives the electro-hydraulic pump 22 is started. As a motor revolution number N rises, an assist power is added to the operation of the steering wheel 18, and the rise in the steering torque Tss is suppressed. When a steering torque starts to decrease falling below a torque threshold Tm, in a short time period, the motor 22b is settled down to a stand-by revolution number at a predetermined motor revolution number reduction time period or stopped at a stop time period tstop. At this time, the reason why the motor is settled at a stand-by revolution number or stopped in a short time period is to save energy. When the steering wheel 18 is operated again during running at medium speed, the above-mentioned operations are repeated.

In the case of running at medium speed, a torque threshold Tm is set to be a medium value (for example, 1.5 Nm), and the rate of rise in rotation dN/dtf of the motor 22b is set to be moderate.

Figure 15:
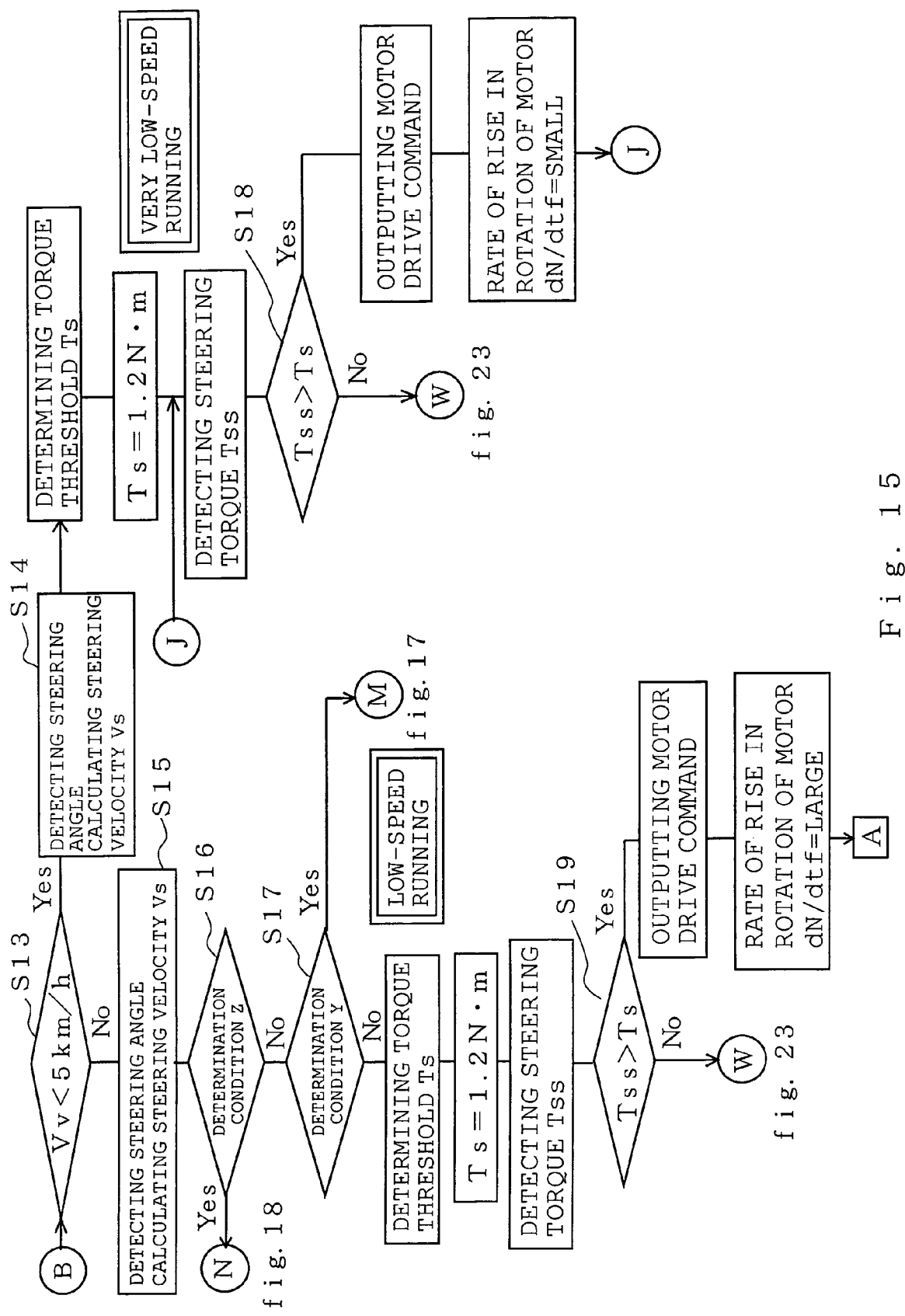
FIG. 15 is a flowchart showing a control at the time of running at low speed and a very low speed according to the invention.

FIG. 15 is a flowchart showing the control at the time of running at low speed and running at very low speed in the vehicle electro-hydraulic power steering unit according to the invention. First, in the case where a vehicle speed is not less than 0 km/h in Step S3 of FIG. 13 (S3; Yes), it is determined in Step S13 of FIG. 15 whether or not a vehicle speed is less than 5 km/h. In the case where a vehicle speed is not less than 5 km/h (S13; No), a steering angle θ is detected by the steering angle sensor 40 in Step S15, and a steering velocity Vs is calculated based on an internal timer. Thereafter, in the case of being detected on the determination condition Z of Step S16 (S16; Yes), the program proceeds to N of FIG. 18, in which running on rough road is determined. In the case of not being detected (S16; No), the program proceeds to Step S17. In the case of No being determined on the determination condition Y of Step S17, running at low speed is determined, and a torque threshold Ts is determined. In the case of Yes being determined on the determination condition Y of Step S17 (S17; Yes), the program proceeds to M of FIG. 17.

In the case of running at low speed in FIG. 15, the torque threshold Ts is set to be 1.2 N·m, and a steering torque Tss is detected by the torque sensor 39. Then, in Step S19, a steering torque Tss is compared with the torque threshold Ts. In the case where a steering torque Tss is larger (S19; Yes), the drive command is output to the motor 22b via the drive circuit 36. The drive command at this time causes the rate of rise in rotation dN/dtf to be larger, and the program returns to Step S0. On the contrary, in the case where a steering torque Tss is smaller than the torque threshold Ts (S19; No), the program proceeds to W of FIG. 23. Through a motor revolution number reduction command or a stop command being outputted, a predetermined motor revolution number reduction time period or a stop time period tstop is outputted, and the program returns to Step S0.

Figure 5:
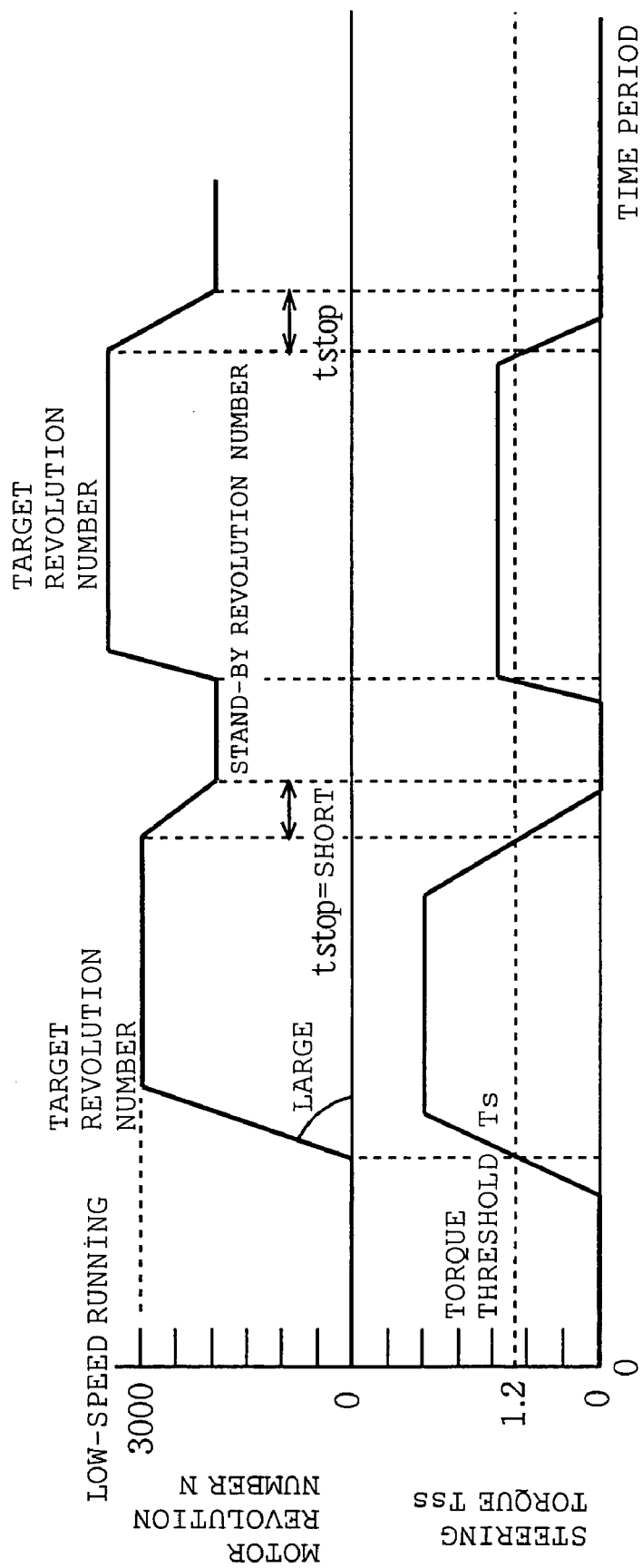
FIG. 5 is a diagram showing a relation between a steering torque and the number of revolutions of a motor with respect to a time period in the case of running at low speed according to the invention.

FIG. 5 is a diagram showing a relation between a steering torque and a motor revolution number with respect to a time period in the case of running at low speed of the vehicle electro-hydraulic power steering unit according the invention. When the steering wheel 18 is operated during running at low speed, the steering torque Tss rises. When the steering torque Tss exceeds a torque threshold Ts, driving the motor 22b that drives the electro-hydraulic pump 22 is started. As a motor revolution number N rises, an assist power is added to the operation of the steering wheel 18, and the rise in the steering torque Tss is suppressed. When a steering torque starts to decrease falling below the torque threshold Ts, in a short time period, the motor 22b is settled down to a stand-by revolution number at a predetermined motor revolution number reduction time period or stopped at a stop time period tstop. At this time, the reason why the motor is settled at a stand-by revolution number or stopped in a short time period is to save energy. When the steering wheel 18 is operated again during running at low speed, the above-mentioned operations are repeated.

In the case of driving at low speed, the torque threshold Ts is set to be a small value (for example, 1.2 Nm), and rotation rate of rise dN/dtf of the motor 22b is set to be large.

As described above, according to this first embodiment, the above-mentioned torque threshold to be set is changed depending on operating conditions of a vehicle, for example, it is made larger as a velocity rises, thereby enabling to achieve improvement in fuel consumption without impairing steerage.

Further, according to the first embodiment, the rate of rise in rotation of the motor is made larger at the time of running at low speed; and it is made smaller at the time of running at high speed. Consequently, it is possible to prevent feeling from getting worse without impairing steerage.

Embodiment 2.

In this embodiment, the foregoing first embodiment is modified such that in the case where a necessary steering torque comes to be smaller than a set torque threshold when a hydraulic pump driving motor has reached a target revolution number and drives the hydraulic pump, the number of revolutions of the hydraulic pump driving motor is reduced to a predetermined revolution number of stand-by (standby) state or to the stop state, and further a time period before reaching a revolution number thereof is changed depending on operating conditions. For example, during general driving, in the case where a steering torque falls below a torque threshold set according to the first embodiment, the number of revolutions of the hydraulic pump driving motor is quickly reduced to a predetermined revolution number. As a result, useless consumption of energy is eliminated.

Embodiment 3.

Now, in the case where a vehicle speed is less than 5 km/h in Step s13 of FIG. 15 (S13; Yes), a steering angle θ is detected by the steering sensor 40, a steering velocity Vs is calculated based on an internal timer in Step S14, and thereafter a torque threshold Ts is determined. A torque threshold is set to be 1.2 N·m, and a very low-speed driving is determined. The torque sensor 39 detects a steering torque Tss. Subsequently, in Step S18, the steering torque Tss is compared with the torque threshold Ts. In the case where the steering torque Tss is larger (S18; Yes), the drive command is output to the motor 22b via the drive circuit 36. The drive command at this time causes the rate of rise in rotation dN/dtf to be smaller, and the program returns to Step S0. On the contrary, in the case where the steering torque Tss is smaller than the torque threshold Ts (S18; No), the program proceeds to W of FIG. 23. Through a motor revolution reduction command or a stop command being outputted, a predetermined motor revolution number reduction time period or a stop time period tstop is outputted, and the program returns to Step S0.

At the time of running at very low speed (0 to 5 km/h), a torque threshold is set to be rather low (for example, 1.2 N·m) likewise in the case of running at low speed so that a steering assist is added early; and the rate of rise in rotation of the motor is made smaller as compared with the case of running at low speed. In this manner, there is no state of lack of steering torque in which a steering wheel is hard to operate during initial phases of steering, and becomes easy to operate on the way due to the excess of assist torque resulted from the sharp rise in oil pressure. Consequently, it is possible to prevent a steering feeling from getting worse. Furthermore, in case of sharply reducing the number of revolutions of the hydraulic pump driving motor when a necessary steering torque falls below a torque threshold as is done in the foregoing second embodiment, an operation sound of the pump is changed from a normal sound to an unpleasant sound. Therefore, the number of revolutions of the hydraulic pump driving motor is reduced to a predetermined revolution number of stand-by state (standby) or to come to the stop state, spending a lot of time.

Figure 6:
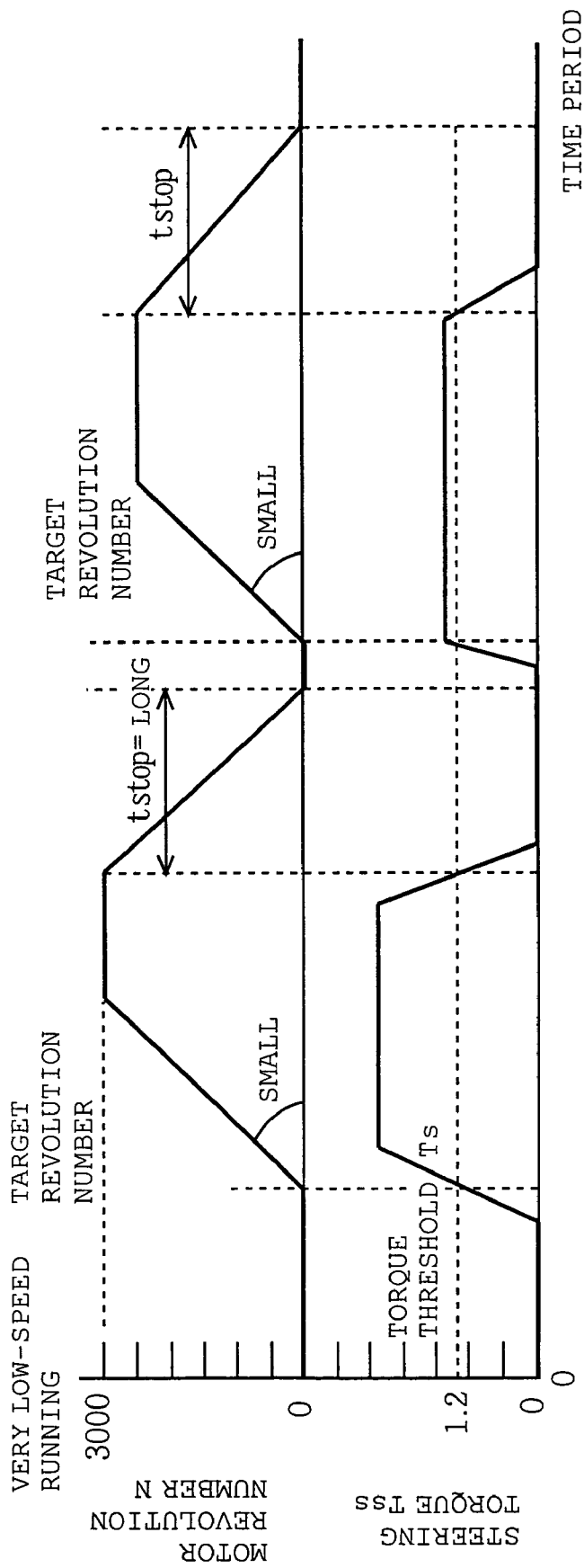
FIG. 6 is a diagram showing a relation between a steering torque and the number of revolutions of a motor with respect to a time period in the case of running at very low speed according to the invention.

FIG. 6 is a diagram showing a relation between a steering torque and a motor revolution number with respect to a time period in the case of running at very low speed in the vehicle electro-hydraulic power steering unit according to the invention. When the steering wheel 18 is operated during running at very low speed, the steering torque Tss rises. When the steering torque Tss exceeds a torque threshold Ts, driving the motor 22b that drives the electro-hydraulic pump 22 is started. As a motor revolution number N rises, an assist power is added to the operation of the steering wheel 18, and the rise in the steering torque Tss is suppressed. When a steering torque starts to decrease falling below the torque threshold Ts, the motor 22b is stopped at a predetermined motor revolution number reduction time period or at a stop time period tstop. When the steering wheel 18 is operated again during running at very low speed, the above-mentioned operations are repeated.

In the case of running at very low speed, the torque threshold Ts is set to be a small value (for example, 1.2 Nm), and the rate of rise in rotation dN/dtf of the motor 22b is set to be small. As for the fall of the motor 22, a predetermined stop time period tstop is set to be longer.

Embodiment 4.

At the time of rapid steering during running at high speed, in order to carry out the so-called high-speed danger avoidance, a torque value is set to be rather low (1.2 N·m) and the rate of rise in rotation of the motor is made large so that a steering assist is added rather early. In this manner, a rapid steering assist can be carried out. In such high-speed danger avoidance, a motion more rapid than being felt is required, so that a rapid steering assist is considered important. In addition, the sharp steering during running at high speed is defined as a steering when a steering velocity is not less than 360 degrees/sec. and when the brake is put on.

Figure 16:
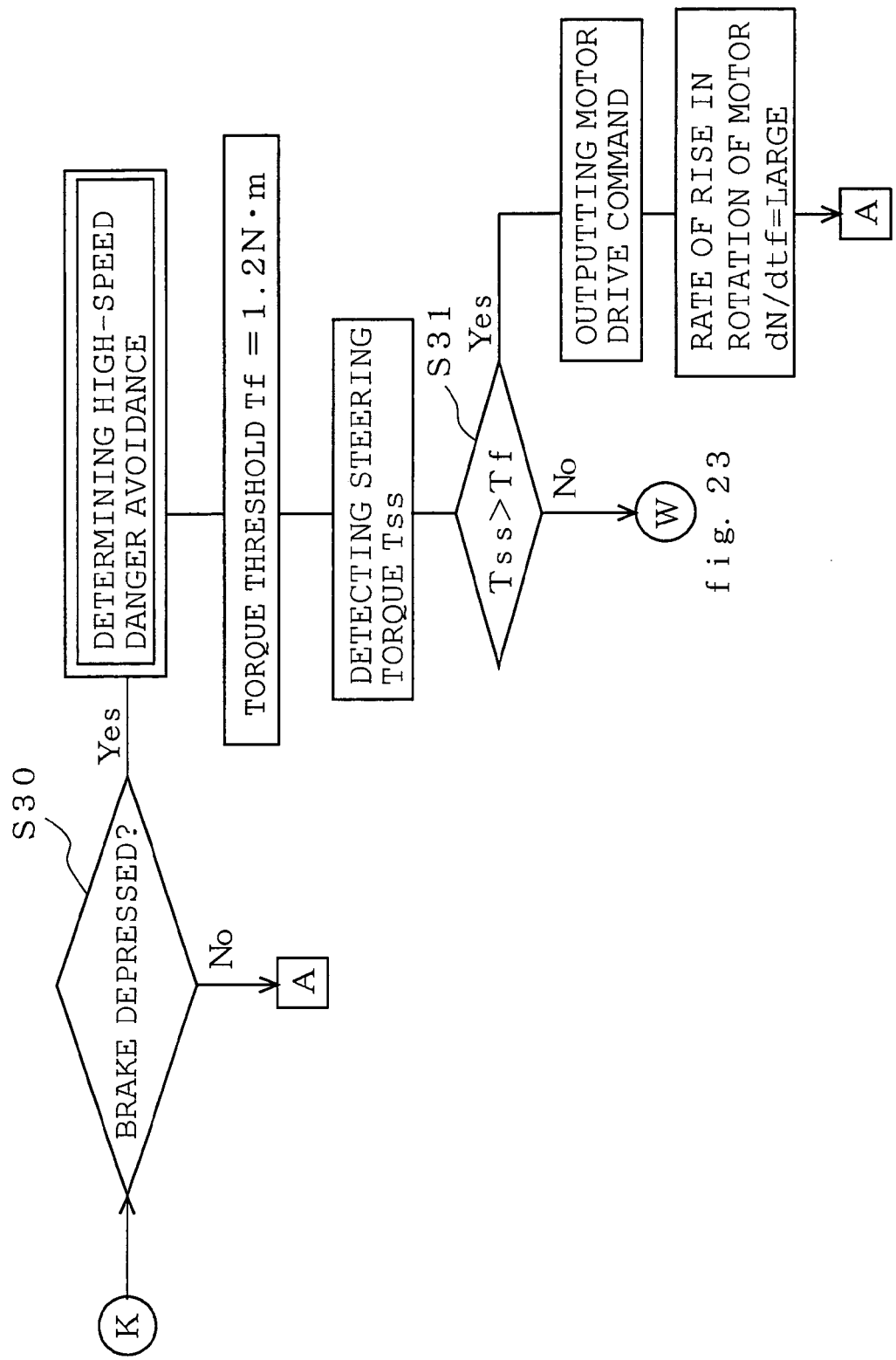
FIG. 16 is a flowchart showing control at the time of high-speed danger avoidance according to the invention.

FIG. 16 is a flowchart showing control at the time of high-speed danger avoidance in the vehicle electro-hydraulic power steering unit. In the case where a steering angle θ having been calculated in Step S5 of FIGS. 13, 14 is not less than 360 deg/s in Step S7 (S7; Yes), it is determined in Step S30 of FIG. 16 whether or not the brake pedal is depressed. In the case of the brake pedal being depressed (S30; Yes), the danger avoidance during running at high speed is determined, a torque threshold Tf is set to be 1.2 N·m, and a steering torque is detected. Then, in Step S31, a steering torque Tss is compared with the torque threshold Tf. In the case of the steering torque Tss being larger (S31; Yes), the motor drive command is outputted. The drive command at this time causes the rate of rise in rotation dN/dtf to be larger, and the program returns to Step S0. On the contrary, in the case where the steering torque Tss is smaller than the torque threshold Tf (S31; No), the program proceeds to W of FIG. 23. Through a motor revolution reduction command or a stop command being outputted, a predetermined motor revolution number reduction time period or a stop time period tstop is outputted, and the program returns to Step S0.

Figure 7:
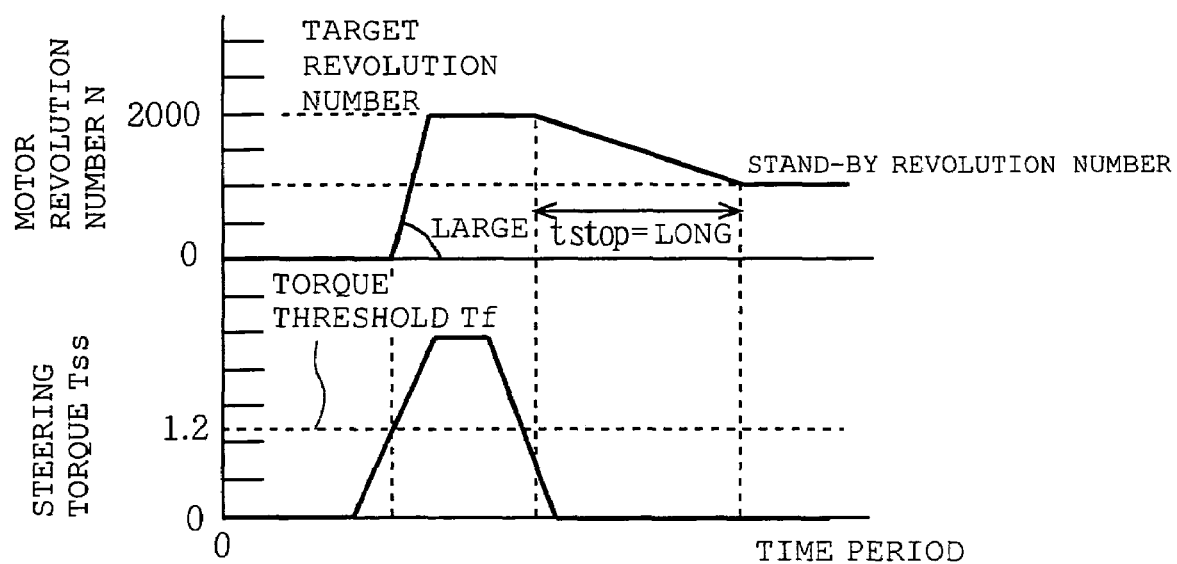
FIG. 7 is a diagram showing a relation between a steering torque and the number of revolutions of a motor with respect to a time period in the case of high-speed danger avoidance according to the invention.

FIG. 7 is a diagram showing a relation between a steering torque and a motor revolution number with respect to a time period in the case of high-speed danger avoidance in the vehicle electro-hydraulic power steering unit according to the invention. When the steering wheel 18 is operated in the case of high-speed danger avoidance, the steering torque Tss rises. When the steering torque Tss exceeds the torque threshold Tf, driving the motor 22b that drives the electro-hydraulic pump 22 is started. As a motor revolution number N rises, an assist power is added to the operation of the steering wheel 18, and the rise in the steering torque Tss is suppressed. When a steering torque starts to decrease falling below the torque threshold Tf, the motor 22b is stopped at a predetermined motor revolution number reduction time period or at a stop time period tstop.

In the case of high-speed danger avoidance, the torque threshold Tf is set to be a small value (for example, 1.2 Nm) than in the case of running at high speed, and the rate of rise in rotation dN/dtf of the motor 22b is set to be large than in the case of running at high speed. As for the fall of the motor 22, a predetermined motor revolution number reduction time period or stop time period tstop is set to be longer.

Embodiment 5.

At the time of running on mountain road (curvy road), frequent steering is required. Accordingly, even in the case where a necessary steering torque falls below a set torque threshold, a time period until the number of revolutions of the hydraulic pump driving motor is made to fall to that in the stand-by state or in the stop state, is set to be longer than at the time of general driving (at high speed, medium speed, and low speed) on the ordinary road not being mountain road. That is, since frequent steering is required, even if the number of revolutions of the hydraulic pump driving motor is made to fall to that in the stand-by state or in the stop state every time a steering torque falls below a torque threshold, a steering torque exceeds a torque threshold at once again. Therefore, there is no much time period during which the number of revolutions of the hydraulic pump driving motor is settled down in the stand-by state or in the stop state, which results in no saving of energy. In addition, as a definition of running on mountain road, in the case where not less than 5 times of steering to the right or left of not less than a predetermined steering angle θ/3 minutes is carried out, it is determined to run on mountain road for a predetermined time period on and after that time.

Figure 17:
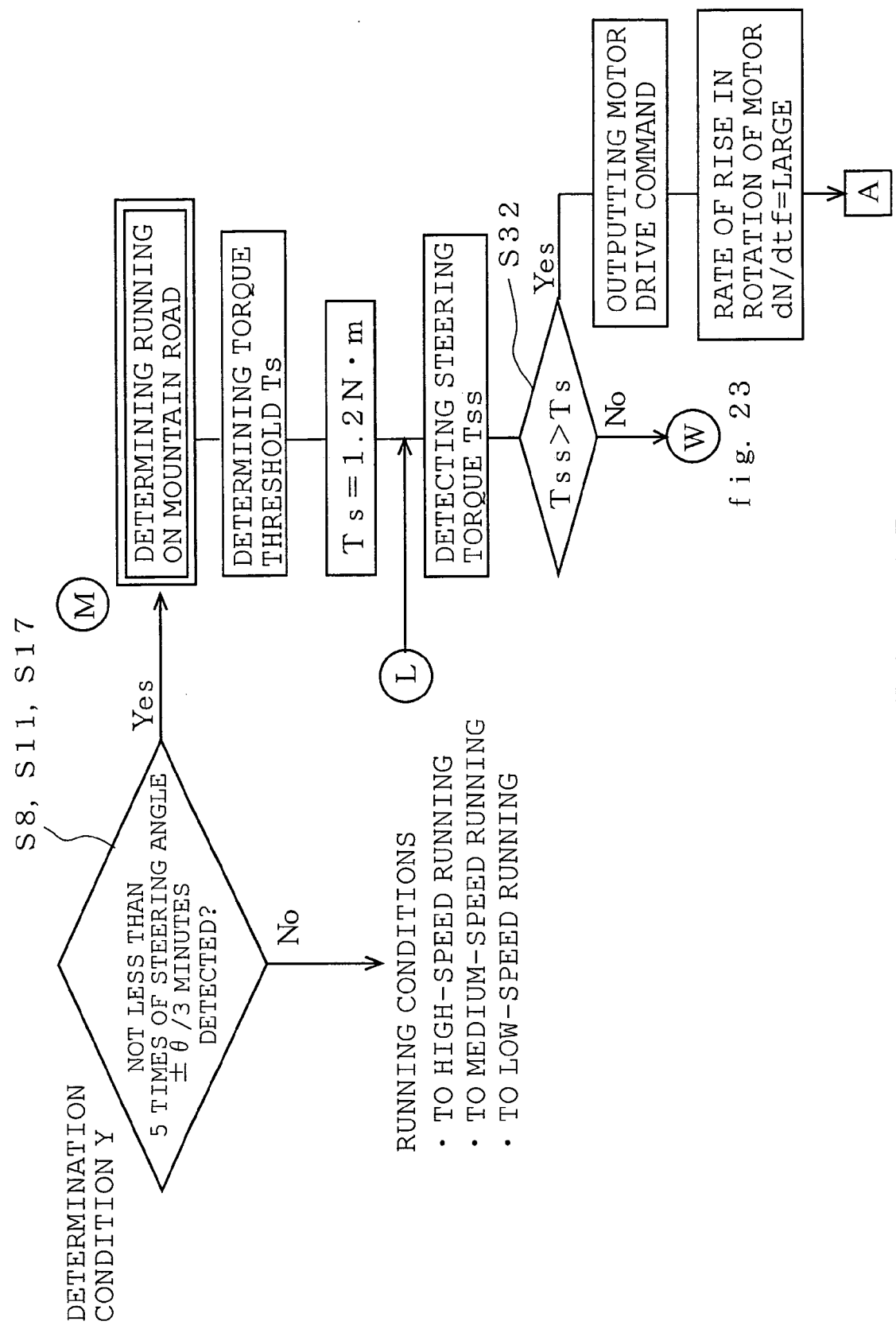
FIG. 17 is a flowchart showing control at the time of running on mountain road according to the invention.

FIG. 17 is a flowchart showing control at the time of running on mountain road in the vehicle electro-hydraulic power steering unit according to the invention. On the basis of the determination of Yes on the determination condition Y of Step S8 of FIG. 14, on the determination condition Y of Step S11 of FIG. 13, or on the determination condition Y of Step S17 of FIG. 15 (not less than 5 times of steering angle±θ are detected in 3 minutes), running on mountain road is determined, a torque threshold Ts is set to be 1.2 N·m, and a steering torque Tss is detected. Then, in Step S32, the steering torque Tss is compared with the torque threshold Ts. In the case of the steering torque Tss being larger (S32; Yes), the motor drive command is outputted. The drive command at this time causes the rate of rise in rotation dN/dtf to be larger, and the program returns to Step S0. On the contrary, in the case where the steering torque Tss is smaller than the torque threshold Ts (S32; No), the program proceeds to W of FIG. 23. Through a motor revolution number reduction command or a stop command being outputted, a predetermined motor revolution number reduction time period or a stop time period tstop is outputted, and the program returns to Step S0.

Figure 8:
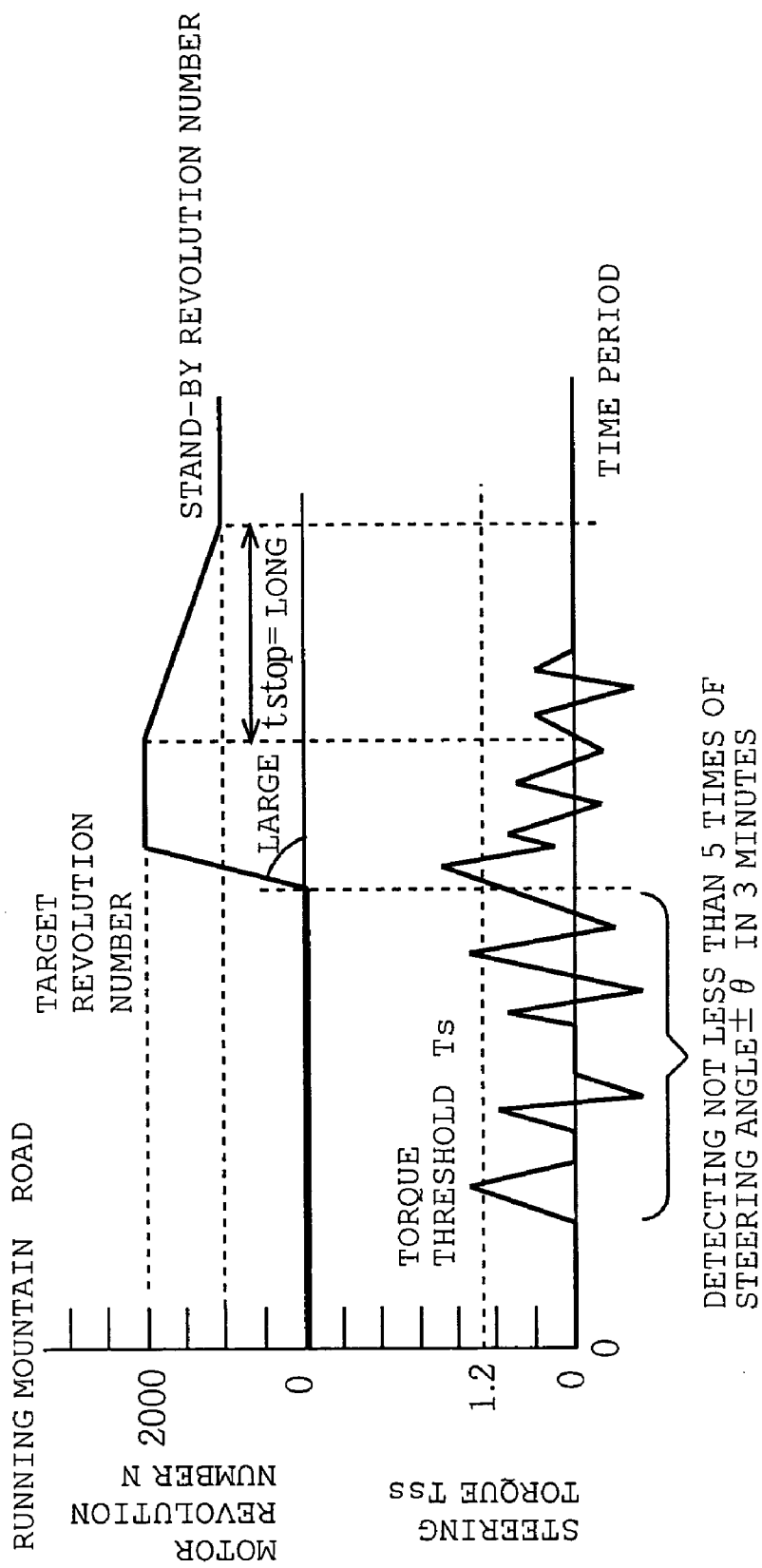
FIG. 8 is a diagram showing a relation between a steering torque and the number of revolutions of a motor with respect to a time period in the case of running on mountain road according to the invention.

FIG. 8 is a diagram showing a relation between a steering torque and a motor revolution number with respect to a time period in the case of running on mountain road in the vehicle electro-hydraulic power steering unit according to the invention. When the steering torque Tss exceeds the torque threshold Ts at the time of running on mountain road, driving the motor 22b that drives the electro-hydraulic pump 22 is started. When the steering torque Tss falls below the torque threshold Ts after a predetermined time period has passed, in a time period rather longer than that in the running at low speed, the motor 22b is settled down to a stand-by revolution number at a predetermined motor revolution number reduction time period or stopped at a stop time period tstop.

In the case of running on mountain road, the torque threshold Ts is set to be a small value (for example, 1.2 Nm) likewise in the case of running at low speed, and the rate of rise in rotation dN/dtf of the motor 22b is set to be large likewise in the case of running at low speed.

Embodiment 6.

In the case of running on rough road, there is a large reaction force from the road surface, bringing about a change in torque of large amplitude to the sides. Moreover, in some cases of running on rough road, a torque is added to a steering wheel without steering, and the number of revolutions of the hydraulic pump driving motor rises, resulting in useless consumption of energy. Therefore, a torque threshold is set to be rather high (2.5 N·m) than at the time of running at high speed, and the rate of rise in rotation of the motor is set to be smaller than at the time of running at low speed. In this manner, any uncontrollable state of steering wheel is distinguished from the steering state intended to do. Additionally, running on rough road is determined when the torque sensor detects a lateral torque amplitude (not less than 2 N·m on one side) on a steady basis for not less than 10 seconds. In the case where the steering wheel is steered due to the reaction force from the road surface depending on road surface conditions, it is preferable to set the determination condition preliminarily on the assumption of such road surface conditions, thereby preventing the hydraulic pump driving motor from being actuated.

Figure 18:
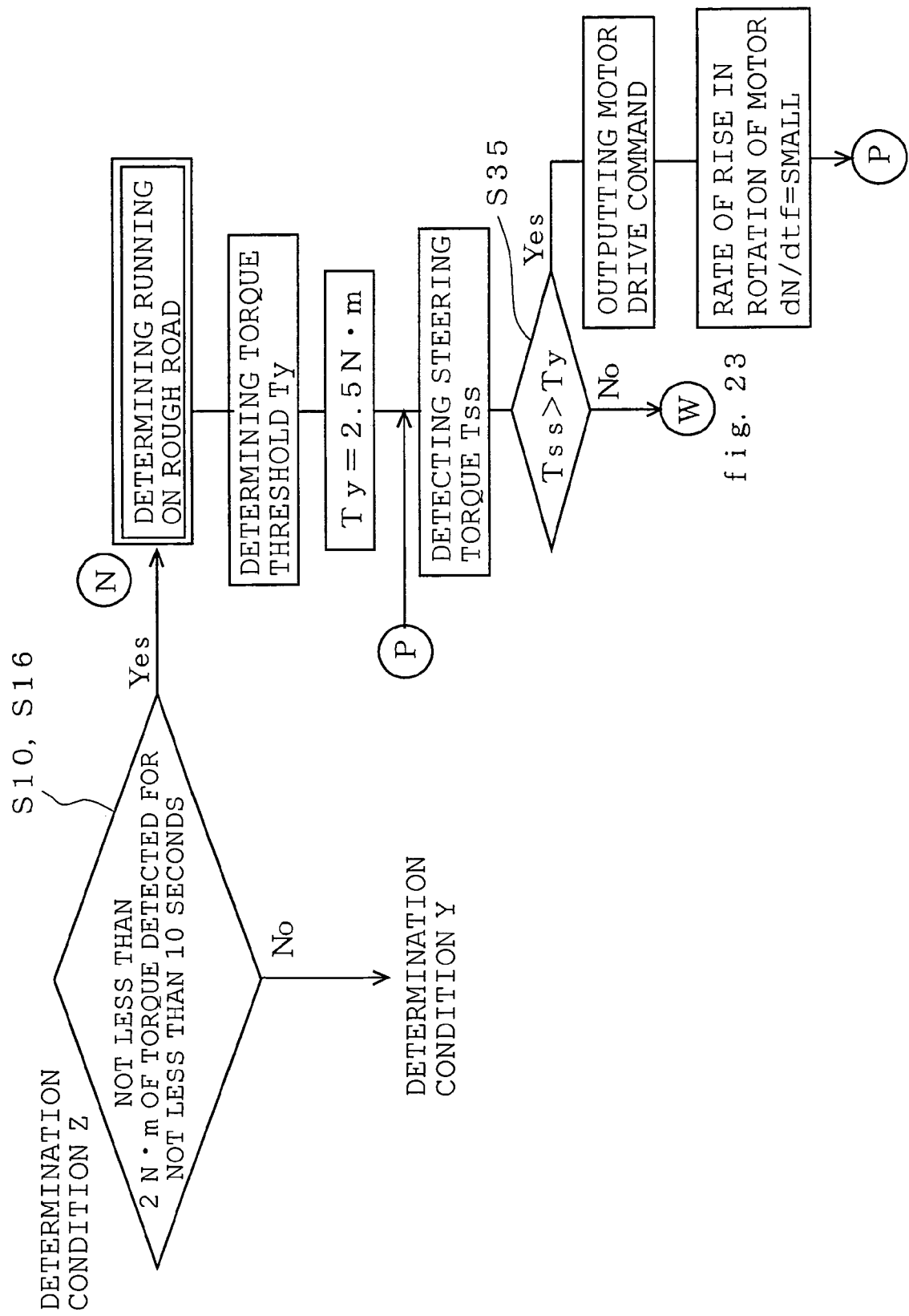
FIG. 18 is a flowchart showing control at the time of running on rough road according to the invention.

FIG. 18 is a flowchart showing control at the time of running on rough road in the vehicle electro-hydraulic power steering unit according to the invention. In the case of detecting the determination condition Z of Step S10 of FIG. 13 (detecting torque amplitude of ±2 N·m for not less than 10 seconds), or the determination condition Z of Step S16, running on rough road is determined, a torque threshold Ty is set to be 2.5 N·m, and a steering torque Tss is detected. Then, in Step S35, the steering torque Tss is compared with the torque threshold Ty. In the case of the steering torque Tss being larger (S35; Yes), the motor drive command is outputted. The drive command at this time causes the rate of rise in rotation dN/dtf to be smaller. On the contrary, in the case where the steering torque Tss is smaller than the torque threshold Ty (S35; No), the program proceeds to W of FIG. 23, in which a predetermined motor revolution number reduction time period or a stop time period tstop is outputted, and the program returns to Step S0.

Figure 9:
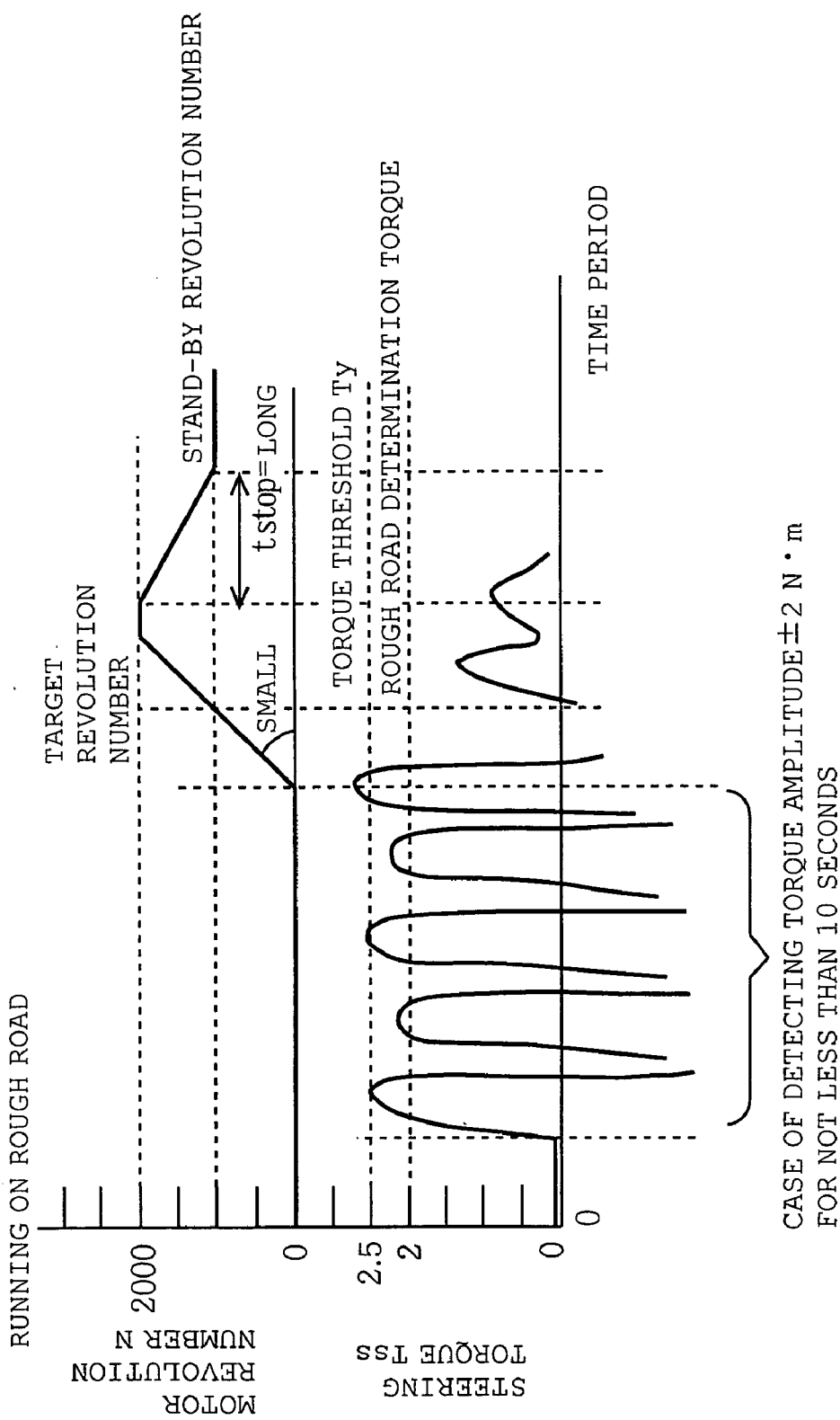
FIG. 9 is a diagram showing a relation between a steering torque and the number of revolutions of a motor with respect to a time period in the case of running on rough road according to the invention.

FIG. 9 is a diagram showing a relation between a steering torque and a motor revolution number with respect to a time period in the case of running on rough road in the vehicle electro-hydraulic power steering unit according to the invention. In the case of running on rough road, the torque threshold Ty is set to be a high value (for example, 2.5 Nm), and the rate of rise in rotation dN/dtf of the motor 22b is set to be small. Further, a comparatively long motor revolution number reduction time period or stop time period tstop is outputted, and the motor is stopped.

Embodiment 7.

In the case of determining the parking (idling state), a time period until the number of revolutions of the hydraulic pump driving motor is reduced to a predetermined revolution number of stand-by state or in the stop state, is made loner than in the case of running at low speed. In this manner, there is not much change in fluctuating sound that is generated due to sharp change in rotation of the pump, resulting in fewer occurrences of uncomfortable sounds. In this respect, the parking state is determined in the case where the state of vehicle speed of 0 km/h continues 5 seconds in the state of the emergency brake being yanked. In particular, in the case of automatic car, the case of a shift lever being at the parking position continues 5 seconds is determined as the parking state.

Figure 19:
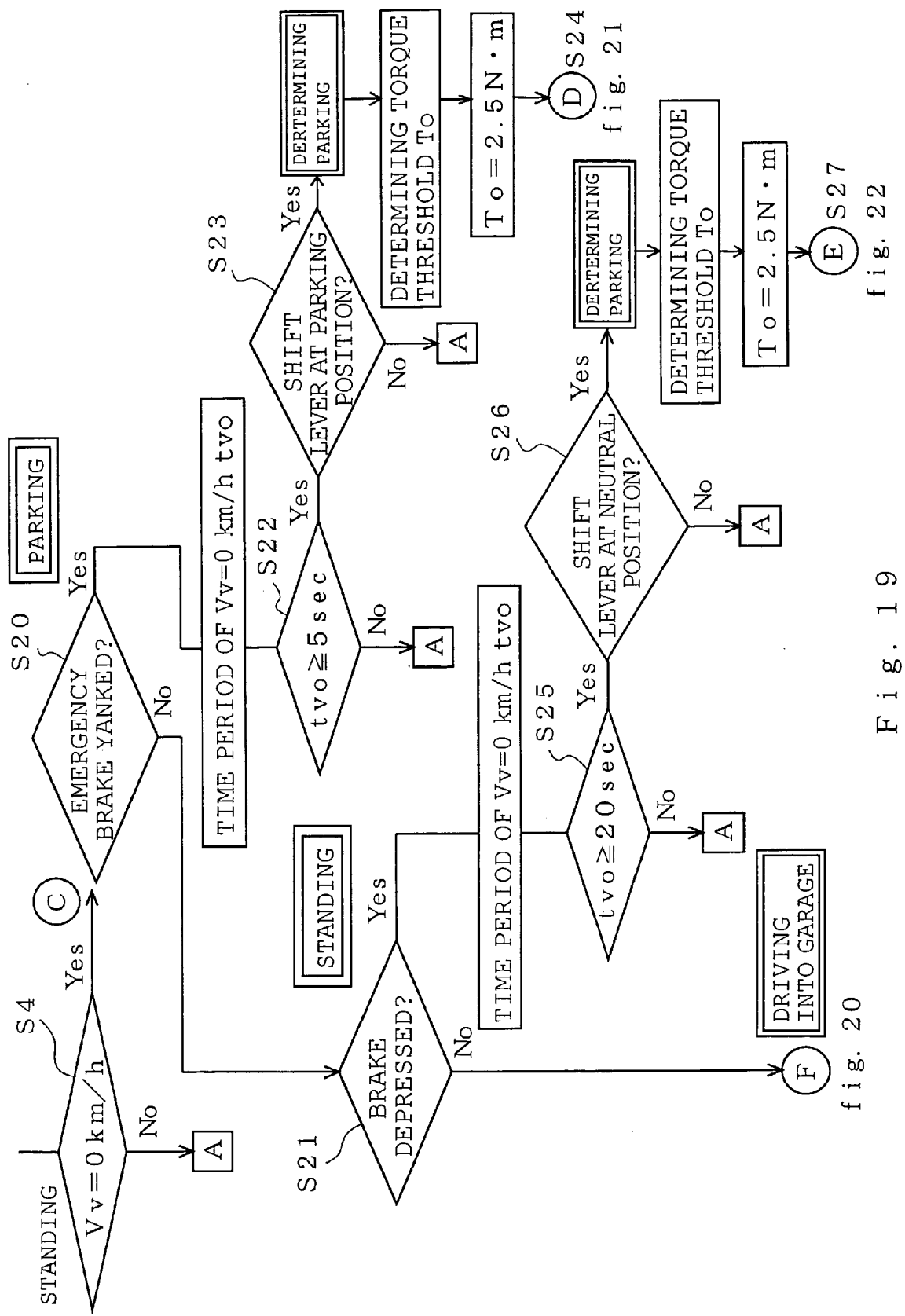
FIG. 19 is a flowchart showing control at the time of stopping and parking according to the invention.
Figure 21:
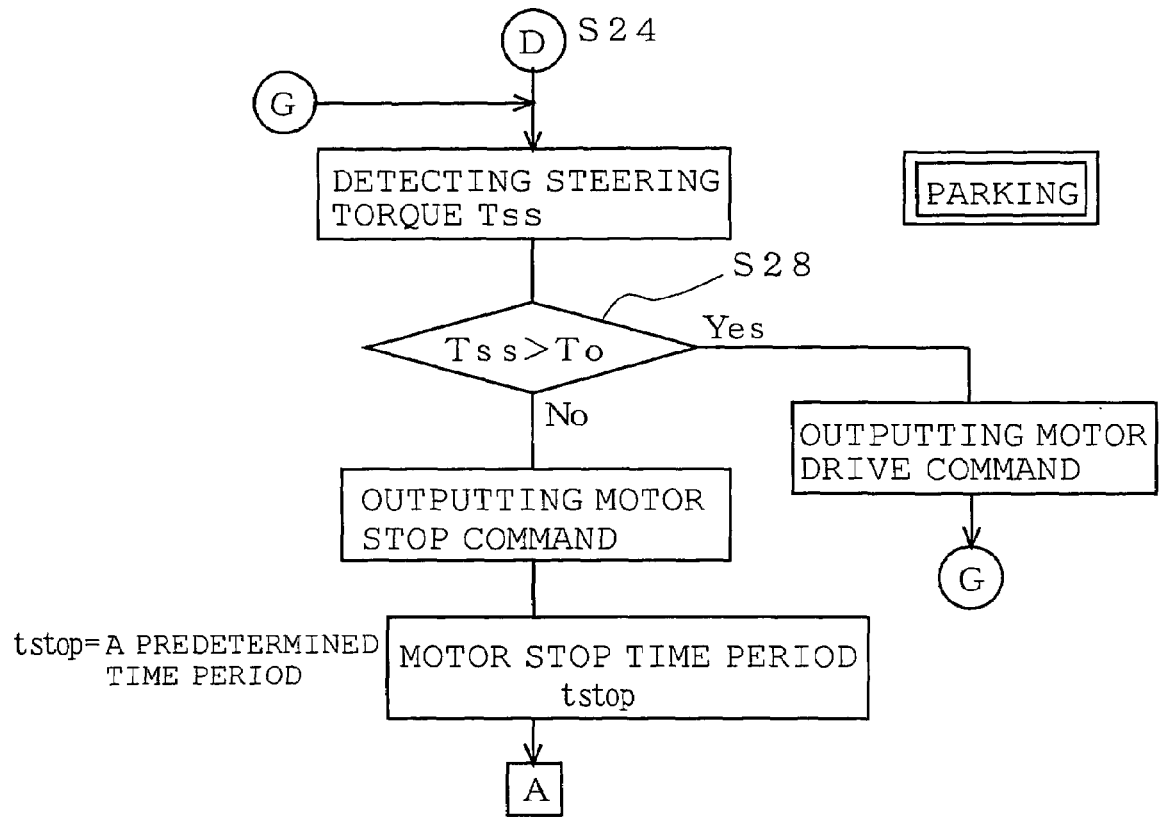
FIG. 21 is a flowchart showing a control at the time of parking subsequent to FIG. 19.

FIG. 19 is a flowchart showing control at the time of stopping and parking in the vehicle electro-hydraulic power steering unit according to the invention. First, in Step S4 (FIG. 13), it is determined whether or not a vehicle speed is 0 km/h. In the case where the vehicle speed is 0 km/h (S4; Yes), it is determined in Step S20 whether or not the emergency brake is yanked. In the case of the emergency brake being yanked (S20; Yes), the program proceeds to Step S22. In the case where a time period tvo of a vehicle speed Vv=0 km/h is not less than 5 seconds (S22; Yes) in Step S22, it is further determined whether or not a shift lever is at a position of parking. In the case of the shift lever being at the parking position (S23; Yes), the parking is determined. In the case of the parking being determined, a torque threshold To is set to be 2.5 N·m, and the program proceeds to Step S24 (D) of FIG. 21, in which a steering torque Tss is detected. Then, the steering torque Tss is compared with a torque threshold T0 in Step S28. In the case of the steering torque Tss being larger (S28; Yes), the motor drive command is outputted. The drive command at this time causes the rate of rise in rotation dN/dtf to be larger. On the contrary, in the case where the steering torque Tss is smaller than the torque threshold To (S28; No), a motor stop command is outputted. A predetermined relatively long stop time period tstop is outputted, and the program returns to Step S0.

Figure 10:
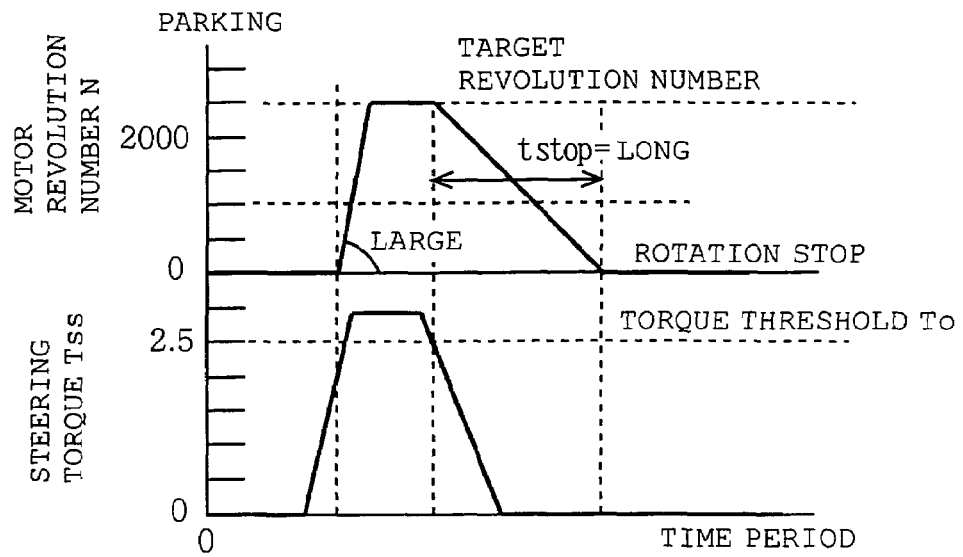
FIG. 10 is a diagram showing a relation between a steering torque and the number of revolutions of a motor with respect to a time period in the case of parking according to the invention.

FIG. 10 is a diagram showing a relation between a steering torque and a motor revolution number with respect to a time period in the case of parking in the vehicle electro-hydraulic power steering unit according to the invention. In the case of parking, the torque threshold To is set to be a high value (for example, 2.5 Nm), and the rate of rise in rotation dN/dtf of the motor 22b is set to be large. Further, the motor is stopped in the stop time period tstop longer than in the case of running at low speed.

Embodiment 8.

In the case of determining the standing (waiting at stop lights·traffic jam state), a time period until the number of revolutions of the hydraulic pump driving motor is reduced to that in the stand-by state or in the stop state is made to be shorter than in the case of parking. In this manner, a useless operation of the motor can be suppressed, resulting in energy saving. In this respect, the standing state is determined in the case where the sate of a vehicle speed 0 km/h continuing for 20 seconds in the state of the brake pedal being depressed, or the emergency brake being yanked. In particular, in the case of an automatic car, the case of the emergency lever being at a neutral position continuing 20 seconds is determined as the standing state.

Figure 22:
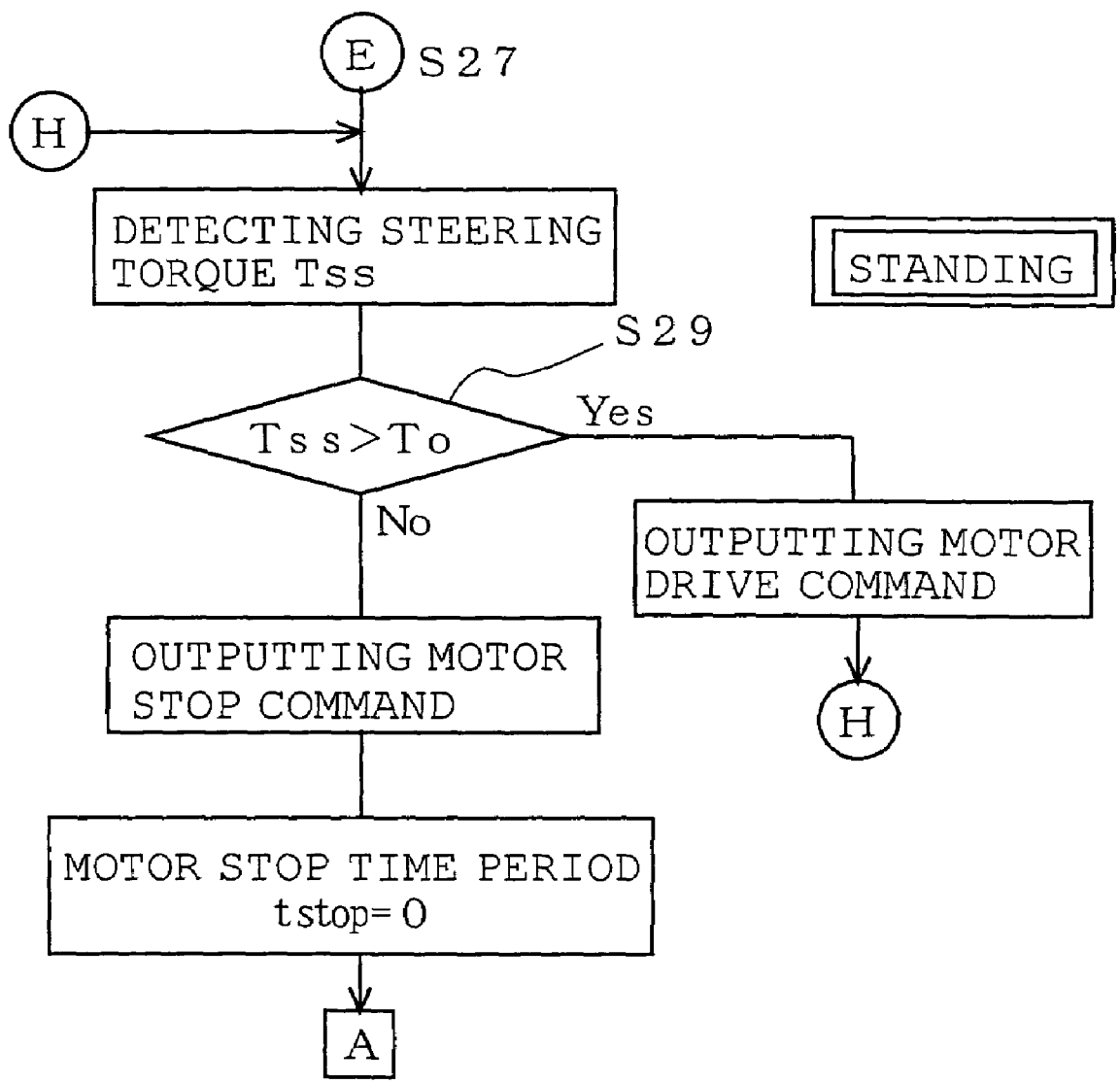
FIG. 22 is a flowchart showing a control at the time of stopping subsequent to FIG. 19.

Now, in the case where it is determined in Step S20 of FIG. 19 that the emergency brake is not yanked (S20; Yes), it is determined in Step S21 whether or not the brake pedal is depressed. In the case of the brake pedal being depressed (S21; Yes), it is further determined in Step S25 whether or not a time period tvo of a vehicle speed Vv=0 km/h is not less than 20 seconds. In the case of being not less than 20 seconds (S25; Yes), the program proceeds to Step S26. Further, in the case where the shift lever is at the neutral position in Step S26 (S26; Yes), the standing is determined. In the case of standing being determined, a torque threshold To is set to be 2.5 N·m, and the program proceeds to Step S27 (E) of FIG. 22, in which a steering torque Tss is detected. Then, in Step S29, the steering torque Tss is compared with the torque threshold T0. In the case of the steering torque Tss being larger (S29; Yes), the motor drive command is outputted. The drive command at this time causes the rate of rise in rotation dN/dtf to be larger. On the contrary, in the case where the steering torque Tss is smaller than the torque threshold To (S29; No), a motor stop command is outputted, and the motor is stopped at once. The program returns to Step S0.

Figure 11:
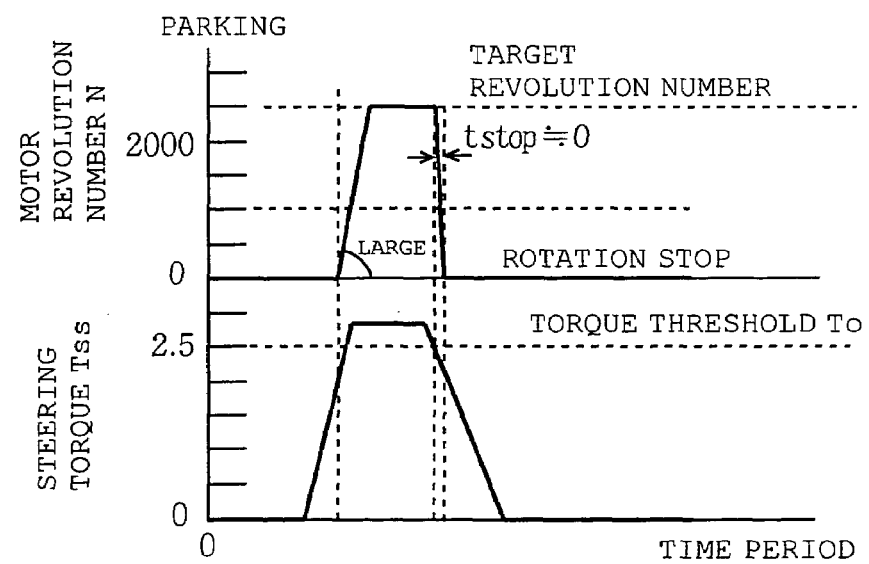
FIG. 11 is a diagram showing a relation between a steering torque and the number of revolutions of a motor with respect to a time period in the case of stopping according to the invention.

FIG. 11 is a diagram showing a relation between a steering torque and a motor revolution number with respect to a time period in the case of standing in the vehicle electro-hydraulic power steering unit according to the invention. In the case of standing, the torque threshold To is set to be a high value (for example, 2.5 Nm), and the rate of rise in rotation dN/dtf of the motor 22b is set to be large. The stop time period tstop is nearly 0.

Embodiment 9.

When determining the state of driving into the garage, there are many times of steering per unit time, so that a torque threshold is set to be rather high (not less than 2 N·m), and the rate of rise in rotation of the motor is made larger. In this manner, although a large steering force is required during initial phases of steering, the motor is activated rapidly, thereby enabling to achieve a rapid steering assist.

In this respect, the state of driving into the garage is defined as a case of running in the state of low speed (5 to 20 km/h), a shift lever being brought in back, and subsequently running in the state of low speed again.

Figure 20:
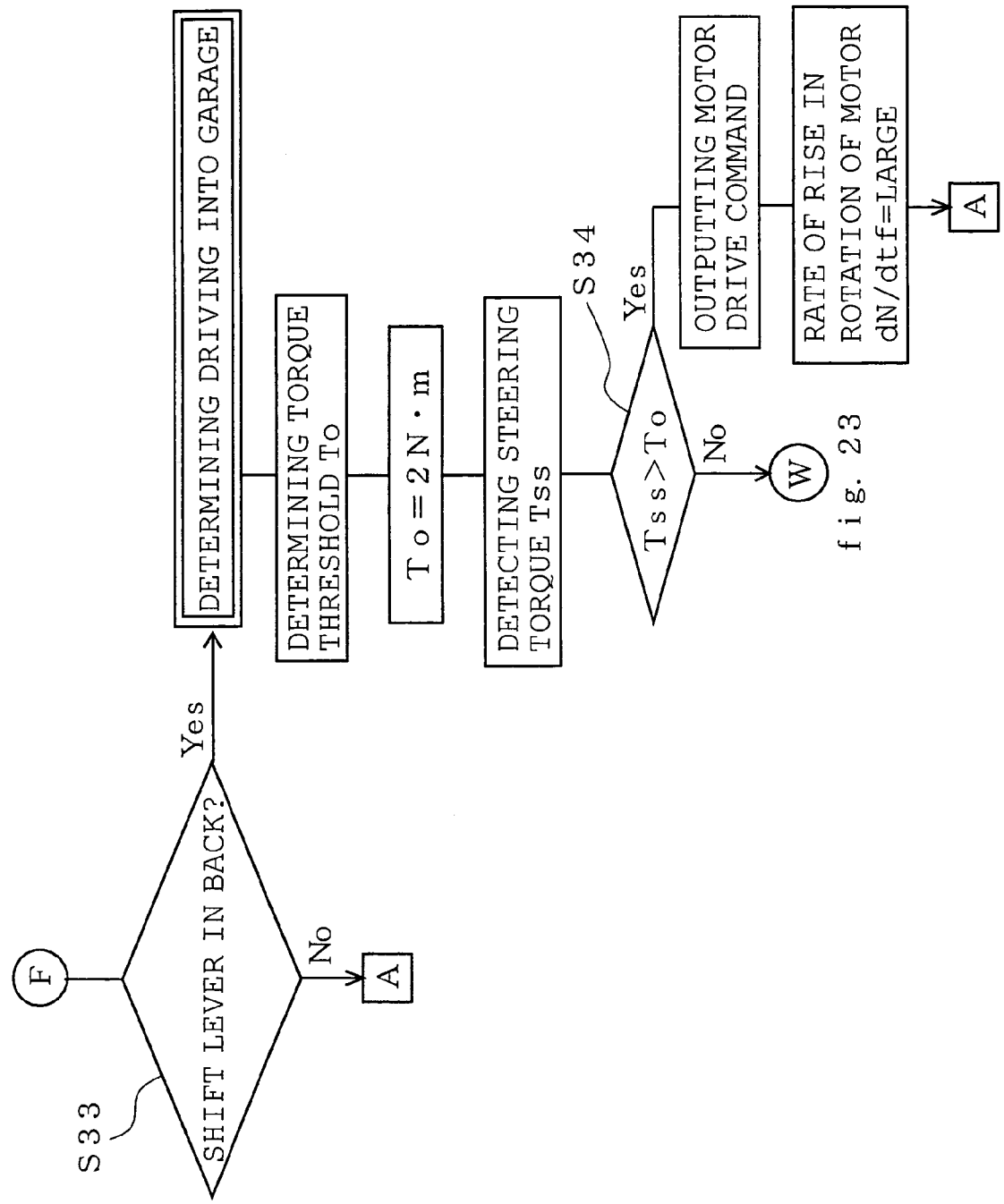
FIG. 20 is a flowchart showing control at the time of driving into the garage according to the invention.

FIG. 20 is a flowchart showing control at the time of driving into the garage in the vehicle electro-hydraulic power steering unit according to the invention. When the brake pedal is not depressed in Step S21 of FIG. 19 (S21; No), it is determined in Step S33 of FIG. 20 whether or not the shift lever is brought into reverse. In the case of the shift lever being in reverse (S33; Yes), the driving into the garage is determined. Further, the torque threshold To is set to be 2 N·m, and a steering torque Tss is detected. Then, in Step S34, the steering torque Tss is compared with the torque threshold T0. In the case of a steering torque Tss being larger, the motor drive command is outputted. The drive command at this time causes the rate of rise in rotation dN/dtf to be larger. On the contrary, in the case where a steering torque Tss is smaller than a torque threshold To (S34; No), the program proceeds to W of FIG. 23. A relatively long motor revolution number reduction time period or a stop time period stop is outputted, and the program returns to Step S0.

Figure 12:
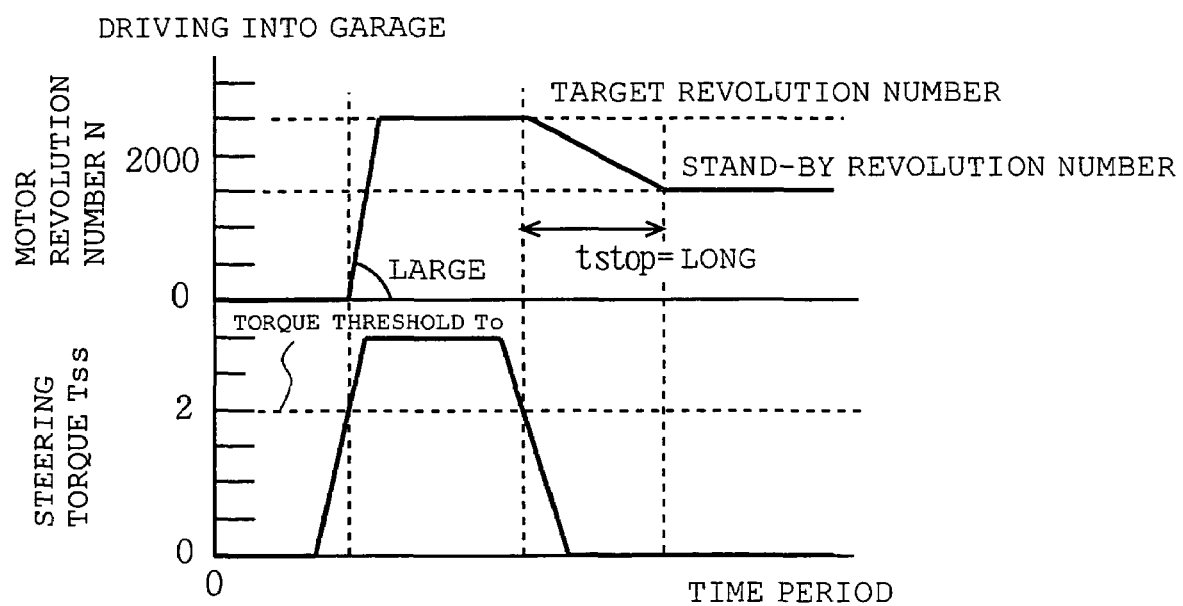
FIG. 12 is a diagram showing a relation between a steering torque and the number of revolutions of a motor with respect to a time period in the case of driving into a garage according to the invention.

FIG. 12 is a diagram showing a relation between a steering torque and a motor revolution number with respect to a time period in the case of driving into the garage in the vehicle electro-hydraulic power steering unit according to the invention. In the case of driving into the garage, the torque threshold To is set to be a value higher than in the case of running at low speed (for example, 2.5 Nm), and the rate of rise in rotation dN/dtf of the motor 22b is set to be so large as in the case of running at low speed. Then, the motor is stopped at a motor revolution number reduction time period or stop time period tstop longer than that in the case of running at low speed.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A vehicle electro-hydraulic power steering unit comprising:
   a steering mechanism steering a steered wheel in a steering direction in response to operation of a steering wheel;
   an electro-hydraulic pump driven with a motor ) as a drive source;
   a piston mechanism that is provided with pressure-receiving chambers on two sides of a piston capable of reciprocating, and that assists said steering mechanism in a steering direction in accordance with a displacement of said piston;
   a hydraulic circuit that provides a connection between said electro-hydraulic pump and each of said pressure-receiving chambers of said piston mechanism via a supply-and-exhaust valve performing a supply and exhaust operation in response to steering of said steering mechanism, and that causes an assist power to be generated in each of the pressure-receiving chambers in response to the steering of said steering mechanism;
   a vehicle speed sensor;
   a torque sensor detecting a steering torque of said steering mechanism;
   a steering angle sensor; and
   a control unit controlling said motor that drives said electro-hydraulic pump based on an output signal from said vehicle speed sensor, said torque sensor and said steering angle sensor;
   wherein driving said motor of said electro-hydraulic pump is started when said steering torque exceeds a torque threshold to be set, and said torque threshold to be set is changed depending on operating conditions.

2. The vehicle electro-hydraulic power steering unit according to claim 1, wherein said torque threshold to be set is made larger as a vehicle speed rises.

3. The vehicle electro-hydraulic power steering unit according to claim 2, wherein said torque threshold is changed to be smaller and larger, using said torque threshold having been set in a vehicle speed as a central value, depending upon high speed or low speed in steering velocity.

4. The vehicle electro-hydraulic power steering unit according to claim 2, wherein the rate of rise in rotation dN/dtf (where N is the number of revolutions and tf is a time period) of said motor (22b) is changed depending on operating conditions of a vehicle at the time of starting to drive said motor of said electro-hydraulic pump.

5. The vehicle electro-hydraulic power steering unit according to claim 4, wherein the rate of rise in rotation dN/dtf (where N is the number of revolutions and tf is a time period) of said motor is made smaller as a vehicle speed rises at the time of starting to drive said motor of said electro-hydraulic pump.

6. The vehicle electro-hydraulic power steering unit according to claim 4, wherein a time period until the number of revolutions of said motor is reduced to that in a stand-by state or in a stop state, is changed depending on operating conditions when said steering torque falls below a set torque threshold during the operation of said motor.

7. The vehicle electro-hydraulic power steering unit according to claim 1, wherein the rate of rise in rotation dN/dtf (where N is the number of revolutions and tf is a time period) of said motor is changed depending on operating conditions of a vehicle at the time of starting to drive said motor of said electro-hydraulic pump.

8. The vehicle electro-hydraulic power steering unit according to claim 7, wherein the rate of rise in rotation dN/dtf (where N is the number of revolutions and tf is a time period) of said motor is made smaller as a vehicle speed rises at the time of starting to drive said motor of said electro-hydraulic pump.

9. The vehicle electro-hydraulic power steering unit according to claim 7, wherein a time period until the number of revolutions of said motor is reduced to that in a stand-by state or in a stop state, is changed depending on operating conditions when said steering torque falls below a set torque threshold during the operation of said motor.

10. The vehicle electro-hydraulic power steering unit according to claim 7, wherein at the time of running at very low speed slower than running at low speed, the rate of rise in rotation dN/dtf (where N is the number of revolutions and tf is a time period) of said motor is made smaller than at the time of running at low speed; and a time period until the number of revolutions of said motor is reduced to that in a stand-by state or in a stop state is made longer than at the time of running at low speed when said steering torque falls below a set torque threshold during the operation of said motor.

11. The vehicle electro-hydraulic power steering unit according to claim 7, wherein the vehicle is provided with means for detecting high speed danger avoidance, and wherein at the time of high-speed danger avoidance, said torque threshold is set to be lower than that in running at high speed; and the rate of rise in rotation of said motor is made larger than that in running at high speed.

12. The vehicle electro-hydraulic power steering unit according to claim 7, wherein the vehicle is provided with means for detecting garage driving, and wherein at the time of garage driving, said torque threshold is set to be higher than in running at low speed; and the rate of rise in rotation of said motor is set to be as large as in running at low speed.

13. The vehicle electro-hydraulic power steering unit according to claim 1, wherein a time period until the number of revolutions of said motor is reduced to that in a stand-by state or in a stop state, is changed depending on operating conditions when said steering torque falls below a set torque threshold during the operation of said motor.

14. The vehicle electro-hydraulic power steering unit according to claim 13, wherein the vehicle includes means for determining a parking condition, and in the case of the parking condition, when said steering torque falls below a set torque threshold during the operation of said motor, a time period until the number of revolutions of said motor is reduced to that in a stand-by state or in a stop state is made longer than in running at low speed.

15. The vehicle electro-hydraulic power steering unit according to claim 13, wherein the vehicle includes means for detecting a standing condition, and wherein in the standing condition, when said steering torque falls below a set torque threshold during the operation of said motor, a time period until the number of revolutions of said motor is reduced to that in a stand-by state or in a stop state is made shorter than in the case of parking.

16. The vehicle electro-hydraulic power steering unit according to claim 13, wherein the vehicle includes means for detecting running on a curvy road, and wherein at the time of running on a curvy road, in the case where a necessary steering torque falls below a set torque threshold, a time period until the number of revolutions of said motor of said hydraulic pump is reduced to that in a stand-by state or in a stop state is made longer than in running at low speed.

17. The vehicle electro-hydraulic power steering unit according to claim 1, wherein the vehicle includes means for detecting running on a rough road, and wherein at the time of running on rough road, said torque threshold is set to be higher than in running at high speed.

* * * * *